TRANSMITTER

Inventors
N.B. Coley and R.F. Albrighton
By Neil A. Preston,
Their Attorney

Inventors
N.B.Coley and R.F.Albrighton
By Neil H. Preston,
Their Attorney

Inventors
N.B. Coley and R.F. Albrighton
By Neil D. Preston,
Their Attorney

Inventors
N. B. Coley and R. F. Albrighton
By Neil W. Preston,
Their Attorney

March 26, 1957 N. B. COLEY ET AL 2,786,938

CODE COMMUNICATION SYSTEM

Filed Jan. 23, 1951 8 Sheets-Sheet 5

Inventors
N.B. Coley and R.F. Albrighton
By Neil D. Preston,
Their Attorney

March 26, 1957 N. B. COLEY ET AL 2,786,938

CODE COMMUNICATION SYSTEM

Filed Jan. 23, 1951 8 Sheets-Sheet 6

Inventors
N.B.Coley and R.F.Albrighton

By Neil W. Preston,

Their Attorney

March 26, 1957 N. B. COLEY ET AL 2,786,938

CODE COMMUNICATION SYSTEM

Filed Jan. 23, 1951 8 Sheets-Sheet 7

Inventors
N.B. Coley and R.F. Albrighton

By Neil D. Preston,

Their Attorney

TRANSMITTER

RECEIVER

SOLID BAR REPRESENTS ENERGIZATION

COMMUNICATION OF SWITCH CONTROL CODE
"MARK-MARK-MARK-MARK-SPACE-SPACE-MARK"

Inventors
N.B.Coley and R.F.Albrighton
By Neil W. Preston,
Their Attorney

United States Patent Office 2,786,938

Patented Mar. 26, 1957

2,786,938

CODE COMMUNICATION SYSTEM

Nelson B. Coley and Reginald F. Albrighton, Rochester, N. Y., assignors to General Railway Signal Company, Rochester, N. Y.

Application January 23, 1951, Serial No. 207,253

26 Claims. (Cl. 246—3)

This invention relates to code communication systems, and it more particularly pertains to systems for the remote control of railway track switches and signals, and systems for the communication of indications from a railway track layout to a remote control office.

Where a number of track switches and signals at a point remote from a control office are to be governed over a single line circuit via a code communication system, there have in the past been several factors limiting the speed of code communication. Some of these factors are: line propagation time, allowance for differences in operating voltages of the local power supplies at the respective transmitting and receiving stations, slow pickup time for stepping relays heavily loaded with contacts, use of long and short code characters as distinctive characters for communication during the respective steps, slow acting cycle marking relays, etc.

Generally speaking, and without attempting to define the scope of the present invention, the general objects of the present invention are to provide an exceptionally fast operating code communication system that can tolerate relatively unlimited amounts of line propagation time. The present invention is to be considered as providing improvements in the system disclosed in the prior application of N. B. Coley, Ser. No. 155,720, filed April 13, 1950, which has resulted in Patent No. 2,626,382, dated January 20, 1953, and no claim is made herein to that which is disclosed in this prior application.

The code communication according to the present invention is by a system that is normally at rest, and when set into operation transmits over a line circuit a series of code characters that are either marks or spaces, a "mark" being a period of energization of the line circuit, and a "space" being a period of deenergization of the line circuit. Inasmuch as the energy transmitted over the line circuit is not used to actuate the stepping step-by-step after it is once initiated, any combination of marks and spaces to form a complete code may be used, the line circuit being at times continuously deenergized for successive spaces and being at times continuously energized for successive marks.

The time periods for the respective characters are marked off both at the transmitting and receiving stations by the swinging of a torsional pendulum in a code oscillator. Each time the pendulum swings through the center, or neutral, position with respect to torsional spring bias, another step is taken by the associated transmitting or receiving apparatus. Each oscillator is normally energized when the system is at rest, and in its energized position maintains its pendulum in a particular extreme position with its torsional spring under tension. The deenergization of the oscillator is effected by the start of the cycle at the transmitting station, and by the initial deenergization of the line circuit at the receiving station. When initiated, each oscillator swings free for the required number of excursions to actuate all relays of a stepping bank to form the respective required number of channels, one relay being actuated each time the oscillator pendulum swings through its center position.

Another object of the present invention is to obtain seven distinctive time intervals or channels in a code communication cycle by the use of only four relays in each stepping bank. This is accomplished by effectively coding the respective time intervals or channels, and so governing the four stepping relays that they are energized in different combinations for each of the seven steps which are formed. It is to be understood that the actual number of relays and the actual number of channels specified is only by way of example, and that other numbers may be used in accordance with the requirements of practice.

Another object of the present invention is to maintain the speed of operation of the relays of a stepping bank always constant, irrespective of voltage variation, by always dropping away the relays to form the respective steps, the stepping relays having been previously energized to the point of saturation. Thus the applied voltage may fluctuate within a wide range without affecting the operation of the stepping relays in forming the respective steps as long as it is maintained high enough to substantially saturate the magnetic structures of the stepping relays when they are energized.

Another object in the control of the stepping relays is to provide a high power pickup winding that is energized only momentarily upon the picking up of the relays, and a low power holding winding that is normally maintained energized when the code communication system is at rest. This provides for relatively quick picking up of the stepping relays without overheating the windings.

Another object of the present invention is to provide for a repeat of the entire number of steps provided by the stepping bank whenever it may be necessary to transmit a large number of code characters during a communication cycle, as, for example, in the scanning of a large number of indications.

Other objects, purposes, and characteristic features of the present invention will be in part obvious from the accompanying drawings, and in part pointed out as the description of the invention progresses.

In describing the invention in detail, reference is made to the accompanying drawings, in which corresponding parts are designated by like reference characters, and in which similar parts having similar functions are designated by like letter reference characters generally having preceding numerals indicative of the order of the relay operation and succeeding numerals indicative of designation of a distinctive location or station with which the apparatus is associated; and in which:

Figs. 1A and 1B when placed side by side illustrate the transmitting and receiving apparatus of a code communication system provided according to the present invention for the transmission of switch and signal controls from a control office to a single field location;

Figs. 2A and 2B when placed side by side illustrate the transmitting and receiving apparatus of a code communication system provided according to the present invention for the communication of indications from the field location to the control office;

Fig. 3 illustrates a system of checking the execution of the switch controls upon reception at the field location so as to permit the execution of a subsequent signal control transmitted during another cycle of operation of the code communication system, only provided that the execution of all prior transmitted switch controls has been made in correspondence with the particular code that has been received;

Figs. 4A to 4D, inclusive, illustrate different line circuit arrangements that may be employed as a part of the code communication system provided by the present invention;

Figure 1A:
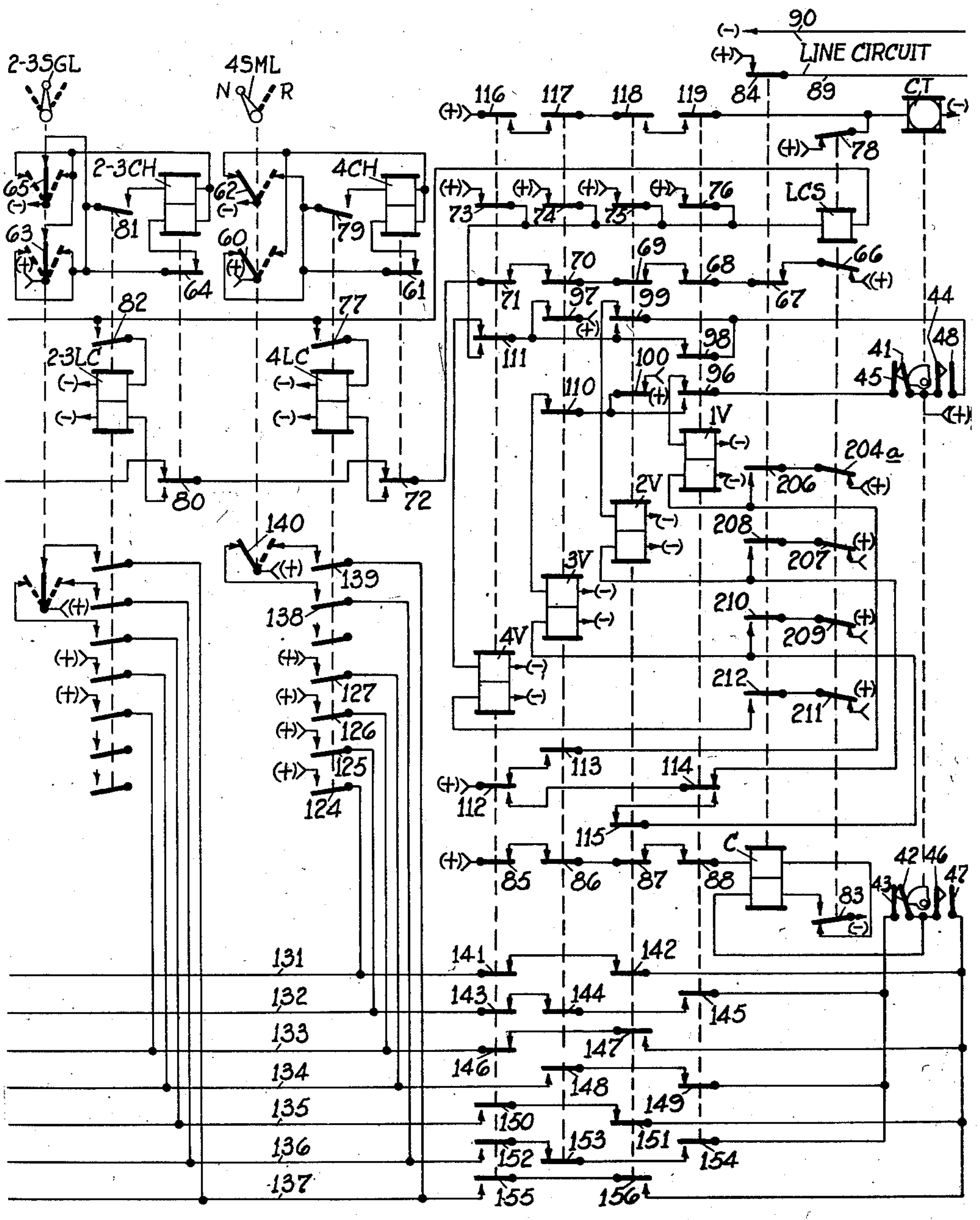

Conventional schematic diagrams have been used for the disclosure of the system organization in the drawings, such drawings being prepared more particularly to facilitate an understanding of the mode of operation of the system, rather than to attempt to point out the details of construction and specific arrangement of components that may be provided by those skilled in the art in accordance with the requirements of practice. The symbols (+) and (−) have been used to indicate connections to the respective positive and negative terminals of suitable batteries or other source of direct current, and the symbols (B+) and (B−) have been used to indicate connections to the respective positive and negative terminals of a suitable split battery or other source of direct current having a center tap designated as (CN).

Figure 3:
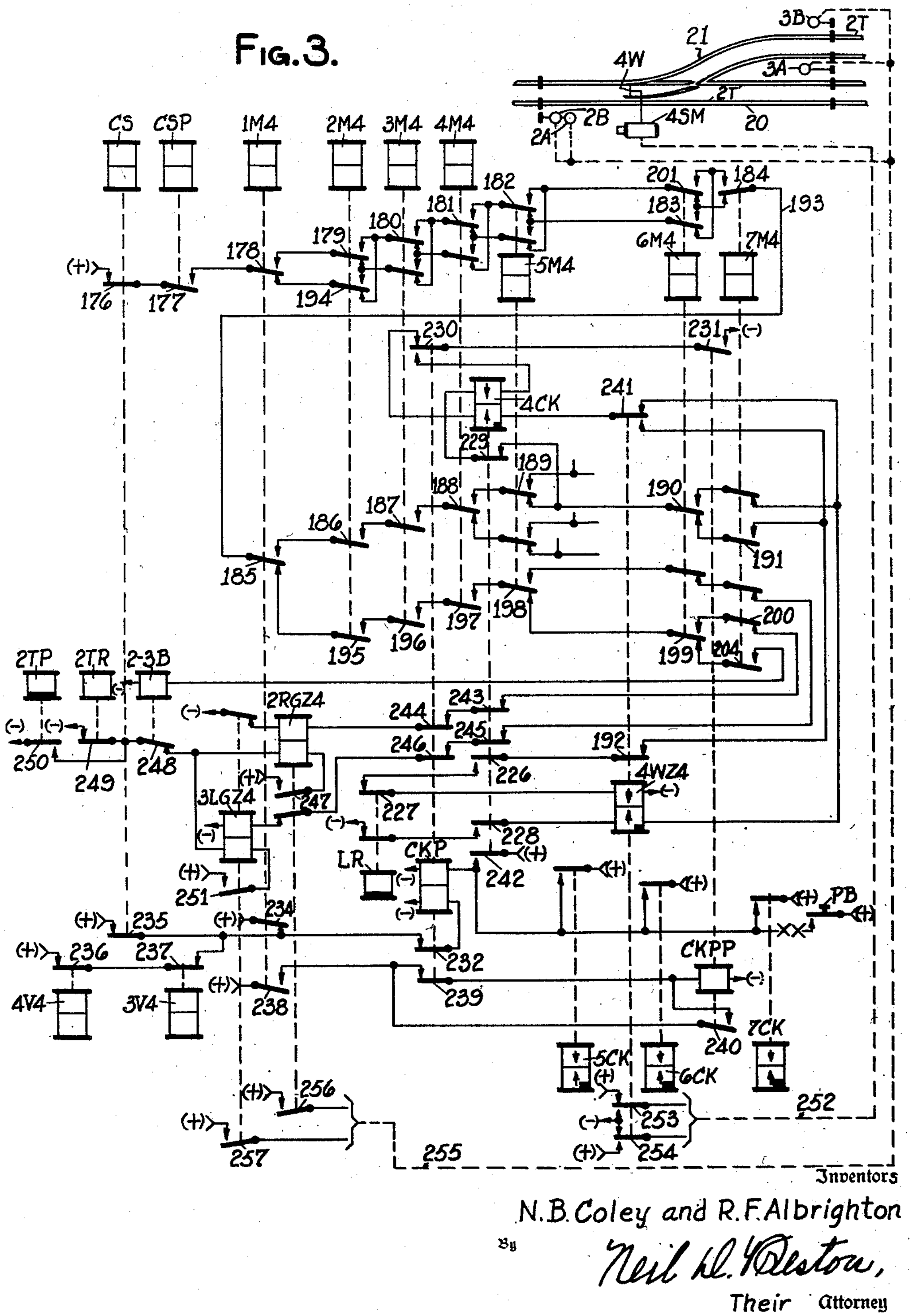

Although it is to be understood that the present invention is readily adaptable for the communication of switch and signal controls from a control office to a remote field station for a track layout having a relatively large number of track switches and signals to be controlled, for the purpose of simplification of this embodiment of the present invention, it has been considered sufficient for an understanding of the present invention that it be applied only for the control of a single track switch and signals governing traffic thereover which may be considered, for example, as a small part of a railway interlocking system, other track switches and signals being governed by respective controls transmitted from the control office in a similar manner to that which will hereinafter be specifically considered for the control of the switch and signals that are illustrated in Fig. 3. According to Fig. 3, a main stretch of track 20 is illustrated as having a second track 21 connected thereto by a track switch 4W which is operated by a power switch machine 4SM. Eastbound traffic over the track switch 4W is governed by the signals 2A and 2B, and westbound traffic is governed by the signals 3A and 3B.

It is to be understood that the system includes a suitable control machine, such as is well known in the art, for use at the control office in governing traffic through the track layout. This machine has a suitable control panel (not shown) having a track diagram constructed thereon with suitable indicator lamps being disposed along the track way of the diagram for indicating the conditions of occupancy of the respective track sections within the controlled territory, together with indicating the positions, and locked conditions of the respective track switches, and the conditions of the signals governing traffic through the track layout for which the control machine is provided. Also disposed on the control panel, either directly on the track diagram, or below the track diagram, in accordance with the requirements of practice, are suitable levers or buttons for the designation of the positions for the suitable track switches, and signals to be controlled. Thus, for example, a switch control lever 4SML (see Fig. 1A) is provided for the control of the track switch 4W (see Fig. 3), and the signal control lever 2–3SGL is provided for controlling the clearing of the signals governing traffic over the track switch 4W. The lever 4SML is a two-position switch, the left-hand position as shown in Fig. 1A being used for governing the power operation of the track switch 4W to its normal position, and the right-hand position of the lever 4SML being used for governing the power operation of the track switch 4W to its reverse position. The signal control lever 2–3SGL is a three-position switch, wherein its center position is used for putting the associated signals to stop, its left-hand position is used for governing the clearing of a signal for westbound traffic, and its right-hand position is used for governing the clearing of a signal governing eastbound traffic. It is to be understood that these switch and signal control levers may be replaced by other types of switches, or by relays, or by buttons or any other suitable means that may be desired to be employed in practice for the designation of the controls that are to be transmitted for respective track switches and signals.

The counting of the respective time intervals assigned for the communication of respective characters in the code communication system provided by this embodiment of the present invention at the respective transmitting and receiving stations is in accordance with the rate of oscillation of a torsional pendulum in a timing device CT such as is disclosed, for example, in the oscillator structure of the U. S. patent to O. S. Field, No. 2,351,588, dated June 20, 1944. This oscillator, according to the Field patent, is adapted to be driven at a constant rate and to be energized for a limited period of each of its operating cycles so as to maintain its oscillations continuous at a uniform rate as long as energy is applied to the device. For the purpose of the present invention, however, it is considered more desirable that the oscillator mechanism be normally inactive but retained in a predetermined one of its extreme operated positions so that it can be started from a predetermined contacting position when it is desired to initiate the stepping of code communication apparatus. Therefore, the oscillator according to the Field patent, is preferably modified to provide that its winding is normally steadily energized when the system is at rest, and upon setting the code communication system into operation, energy is removed from the electromagnet associated with the oscillator mechanism, and the torsional pendulum of the oscillator is thus permitted to swing free in oscillations, the amplitude and periodicity of which is determined by the characteristics of a torsional involute spring such as the sprng 380 illustrated in Fig. 5, for example, combined with the inertia of the pendulum 388 to obtain the desired frequency of operation.

Figures 5, 6, 7:
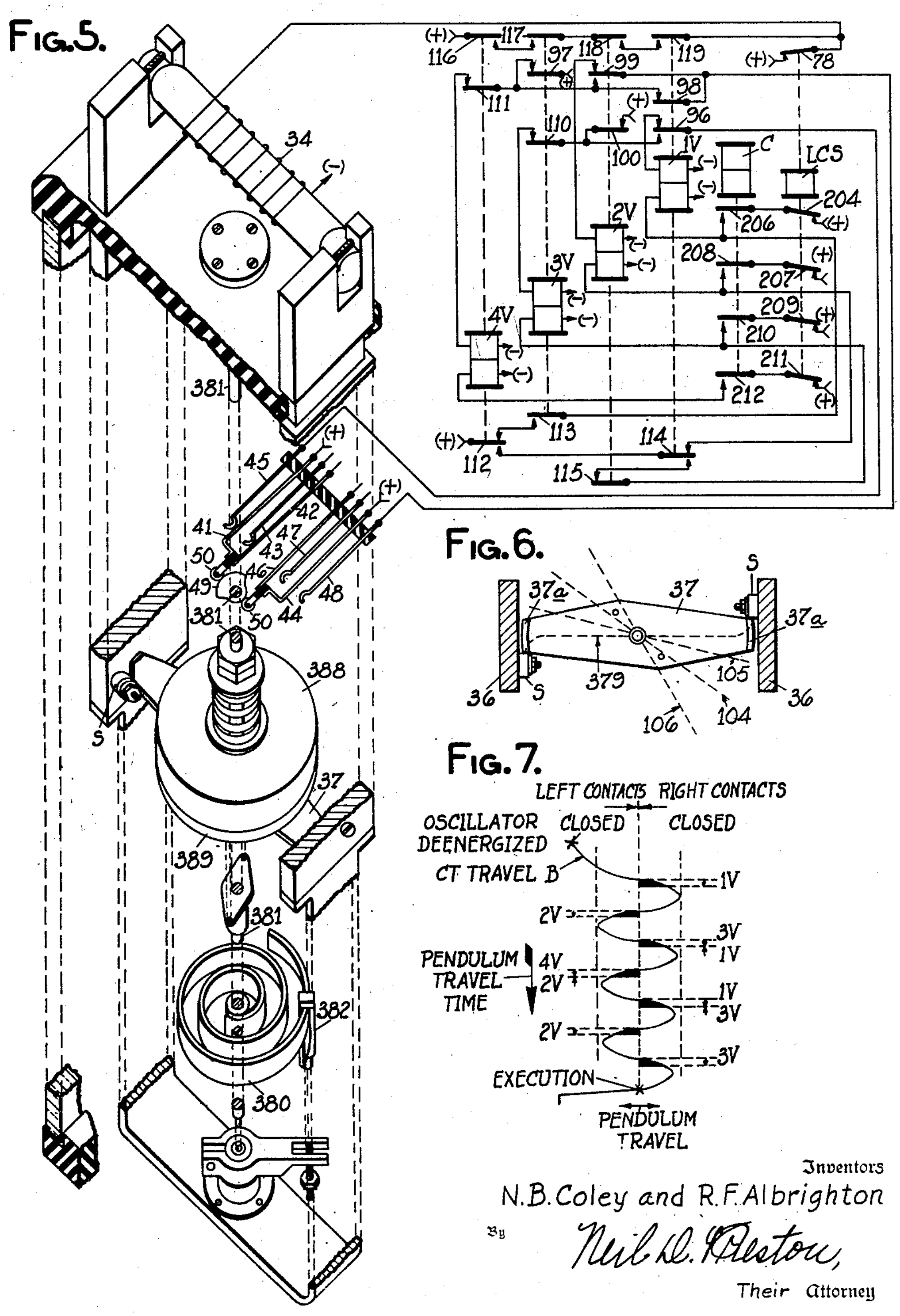
Fig. 5 is an exploded view, in perspective of the principal operating parts of a code oscillator suitable for use in governing the rate of stepping.
Fig. 6 is a plan view of a section of the oscillator illustrating the extent of rotation that provides suitable operating characteristics, and also illustrating the normal position of the oscillator armature when the oscillator is energized.
Fig. 7 is a pendulum travel diagram showing the points in the travel of the pendulum during a cycle at which the respective stepping relays are actuated.

It is desirable that each oscillator CT be provided with suitable stops S against which the armature 37 is maintained when the system is at rest as is fully disclosed in the prior application of N. B. Coley, Ser. No. 155,720, dated April 13, 1950, which has resulted in Patent No. 2,626,382, dated January 20, 1953, already referred to on column 1, lines 39–41, and reference is to be made to this prior application for a more complete disclosure as to the modified oscillator structure preferably provided in accordance with the use of stops S as is shown in Fig. 5 of the present application. For an understanding of the mode of operation of the oscillator CT sufficient for the purpose of the present invention, it will be noted that the armature 37 is normally maintained in its position as shown in Fig. 6 wherein the ends *37a* of the armature 37 are magnetically attracted against the magnetic stops S which are so disposed as to form a path of lowest reluctance for the magnetic field as indicated by the dotted line 379 extending between the pole pieces 36. It will thus be seen that the field setup through the armature 37 and the stops S is such as to magnetically maintain the armature 37 against the stops S as long as the winding 34 of the oscillator is maintained energized.

Upon deenergization of the winding 34, the oscillator armature 37 is released from its attracted position against the stops S, and thus the pendulum 388 starts to rotate because of the torsional force of the spring 380 which is applied to the rotating shaft 381. If this oscillator were to be maintained steadily deenergized until the pendulum 388 were to come to rest, the armature would assume a center line position as indicated by the center line 104 of Fig. 6. Thus this center line 104 represents the neutral position with respect to torsional force applied by the spring 380 to the shaft 381.

Inasmuch as only four free excursions of the oscillator CT are required for the operation of the code communication system according to this embodiment of the present invention, there is no substantial decay in the amplitude of the excursions, but each excursion is a little bit shorter in accordance with the friction, air resistance, etc., that is inherent in the device. This reduction in amplitude is illustrated in the pendulum travel time diagram of Fig. 7. This travel time, however, has no effect upon the rate of stepping, because of the stepping taking place in response to the shifting of contact positions of the oscillator only when the oscillator swings through the center position 104. By this arrangement, a highly accurate rate of stepping is set up, based upon the well known principle that a torsional pendulum has a constant period of oscillation for respective successive excursions of free oscillation, within certain limits of spring tension, after the electromagnet normally locking the oscillator in its inactive position is deenergized.

In accordance with the rotary oscillations of the respective oscillators CT, respective left movable contact fingers 41 and 42, and right contact fingers 43 and 44, are selectively opened and closed against cooperating fixed fingers 45, 46, 47, and 48, respectively, by a suitable actuating cam 49 which is secured on the shaft 381. This cam 49 has been illustrated as having actuating rollers 50 associated with the respective left and right movable contact fingers. This cam 49 preferably is so disposed on the shaft 381 that when the oscillator mechanism is deenergized and permitted to come to rest with the center of the armature 37 aligned along the center line 104, the respective left and right-hand edges of the cam 49 bear against the respective rollers 50 whereby a slight rotation of the shaft 381 is effective to close the left or right-hand contacts, dependent upon the direction of rotation. Thus by this adjustment, and by the contour of the cam 49, the left-hand contacts are maintained closed for the half of each period of oscillation to the right of the center line 104 as viewed in Fig. 6, and the right-hand contacts are closed for the half of each period of oscillation to the left of the center line 104 as viewed in Fig. 6. Although the amplitude of each excursion of the oscillator is dependent upon the mass of the pendulum 388 cooperating with the torsional spring 380, approximate suitable average limits of the excursion are illustrated by the dotted radial lines 105 and 106 of Fig. 6.

It is to be understood that the adjustment of the active length of the torsional spring 380 may be made by the setting of the adjusting lug 382, and that the inertia of the pendulum 388 is relieved by the pendulum 388 being friction coupled to the shaft 381 through the friction disc 389 in a manner fully described in the above mentioned prior application of N. B. Coley.

Although the timing device illustrated and specifically described is well adapted for use with the embodiment of the present invention that is specifically described, it is to be understood that other types of timing devices may be employed as long as they can be adapted to provide the accuracy required according to the requirements of practice.

The transmitter at the control office also comprises relay control apparatus as is illustrated in Fig. 1A. In Fig. 1A, the relays CH, LC, and LCS are provided for the purpose of the initiation of the respective control cycles, each relay CH being effective to store a designated control until the system is available for its transmission, and the relays LC being effective to set up a means for determining the order of transmission when a plurality of controls has been simultaneously set up for transmission. The relay LCS is more directly associated with the initiation of the communication cycle in that it is the picking up of this relay that is effective to deenergize the oscillator CT at the transmitting station and thus actually cause the initiation of the stepping.

The transmission of the respective code characters over the line circuit is effected by the pulsing of a line control relay C, and the selective energization of this control relay C is in accordance with the operation of a stepping relay bank having relays 1V, 2V, 3V, and 4V, which in turn is actuated in response to the operation of the timing device CT.

Figure 1B:
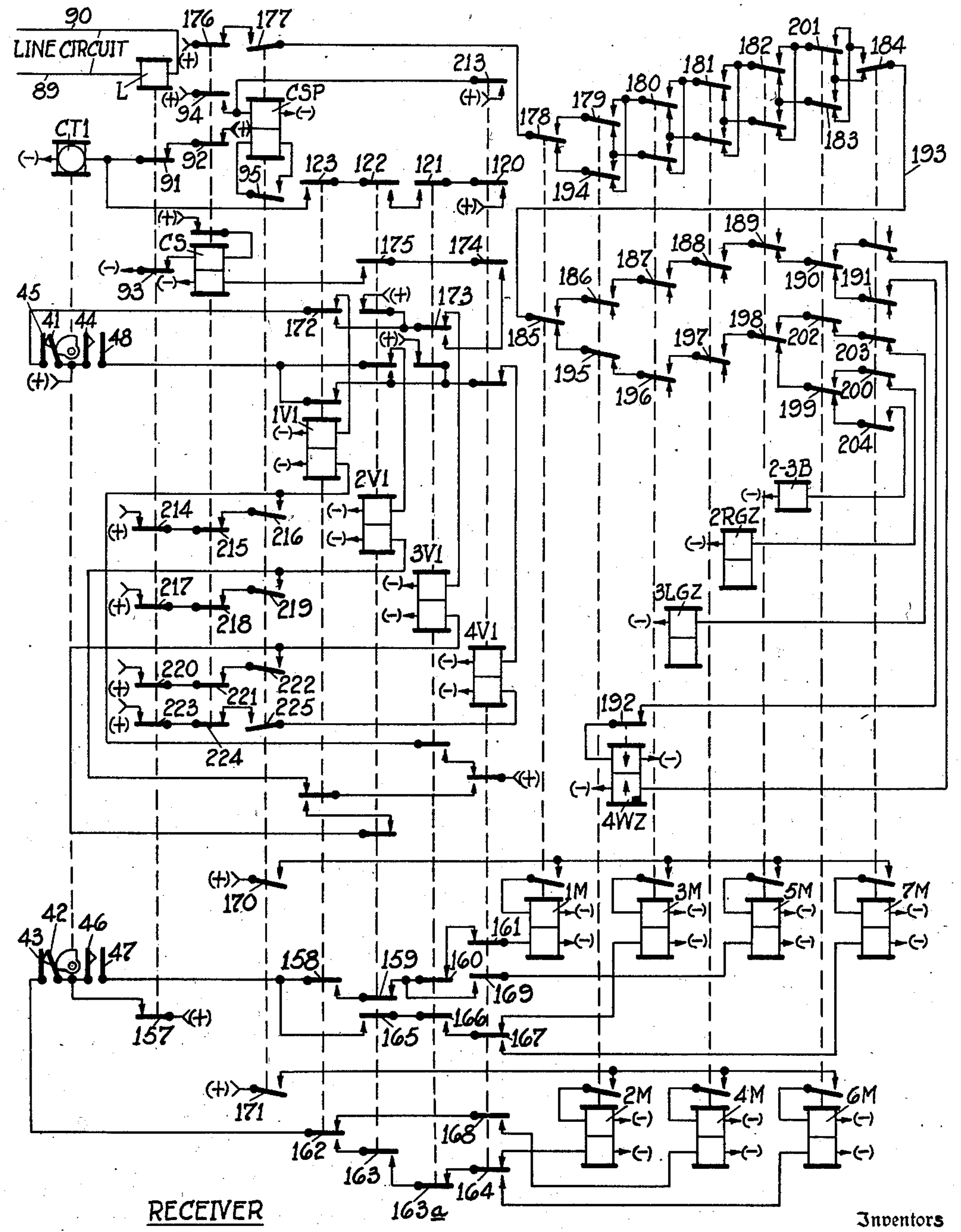

At the receiving station, the relay control apparatus is provided as is illustrated in Fig. 1B for receiving controls that are transmitted from the control office, and response at the receiving station to the line circuit energization is in accordance with the actuation of a quick acting line relay L. This relay can have neutral relay characteristics as far as operating requirements are concerned, but to accomplish maximum speed of operation with low operating current, it may be desirable to use a relay having a polar structure such as is found, for example, in the relay disclosed in the U. S. patent application of O. S. Field, Ser. No. 122,475, filed October 20, 1949, which has resulted in Patent No. 2,617,846, dated November 11, 1952.

With reference to Fig. 1B, the oscillator timing device CT1 is provided for marking off the time intervals for the respective code characters to be received, and this relay is normally inactive but is rendered active by the actuation of the line relay L upon initial reception during a cycle of operation for the communication of a control from the control office to the field location.

A cycle start relay CS is provided at the field station as a means for assisting in setting the receiving apparatus into operation, and this relay is also used in cooperation with a back contact repeater relay CSP in providing an execution period at the end of the communication cycle.

For reception of controls, suitable neutral stepping relays 1V1, 2V1, 3V1, and 4V1 are provided comparable to corresponding stepping relays V provided at the control office, and a bank of decoding relays M is provided for storing the respective "mark" characters that are received upon the reception of a control code. Inasmuch as seven characters are transmitted for this embodiment of the present invention for the communication of controls, there is a relay M provided for each of these seven characters.

Suitable application relays are provided for more directly governing the respective track switches and signals in accordance with the control codes that are executed upon the completion of the respective control cycles of operation. The relays 4WZ, 2RGZ, 3LGZ, and 2–3B that have been shown in Fig. 1B are to be considered typical of other respective switch and signal relays that may be provided in accordance with the requirements of practice. The relay 4WZ is illustrated as being of the magnetic stick type, but it is to be understood that respective normal and reverse neutral relays, or other switch control arrangements, could be provided in accordance with the requirements of practice. Relays 3LGZ and 2RGZ are considered as neutral relays associated with the control of the signals, and these relays when initially energized are generally maintained energized by stick circuits (not shown in Fig. 1B), dependent upon track circuit control so as to be slotted off upon acceptance of the associated signal by a train. These stick circuits are generally arranged to be opened by the transmission of a stop control from the control office, and the relay 2–3B illustrated in Fig. 1B is provided to be responsive to such stop control and to interrupt the stick circuits of the signal control relay GZ with which that stop relay may be associated.

Figure 2A:
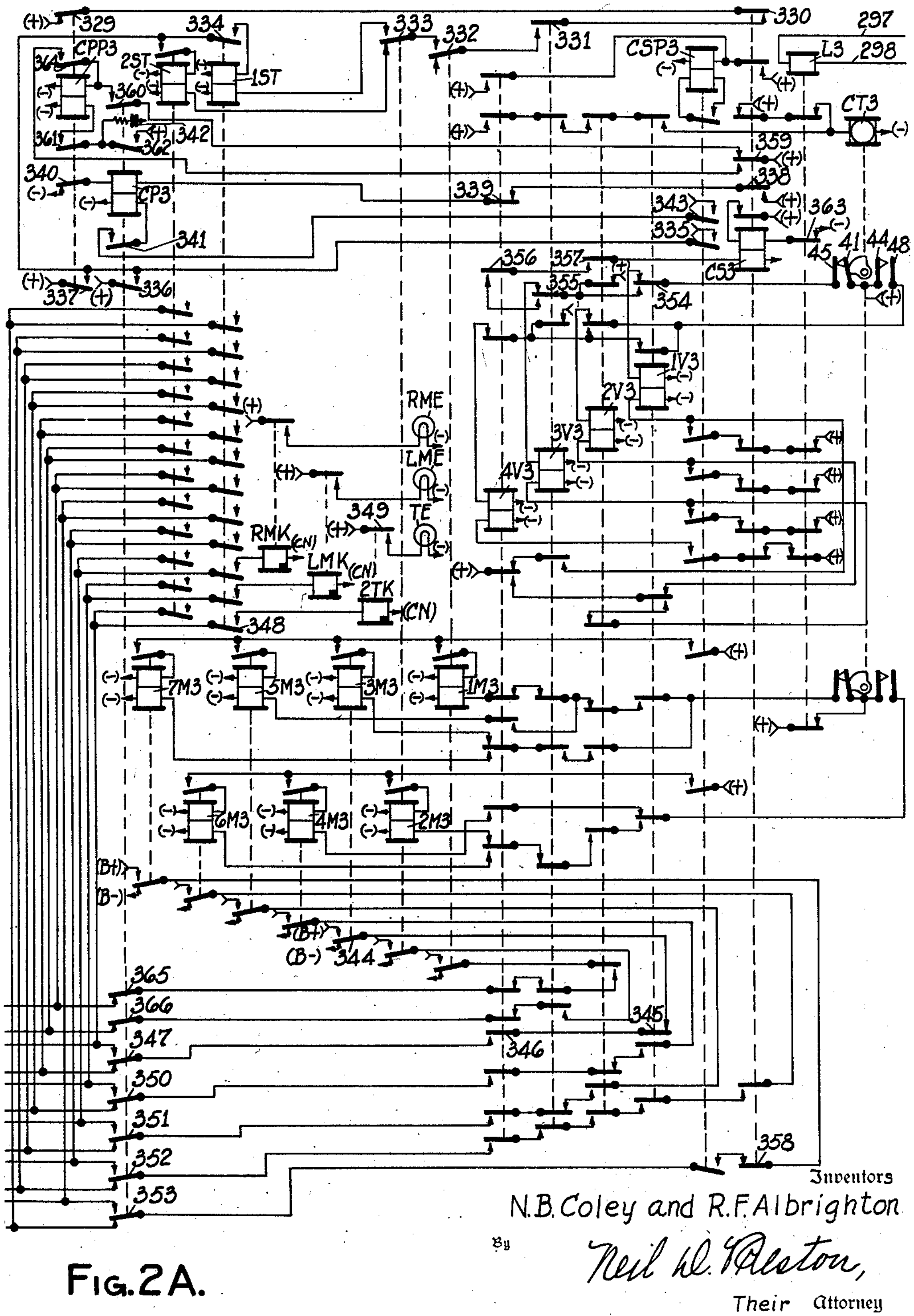
Figure 2B:
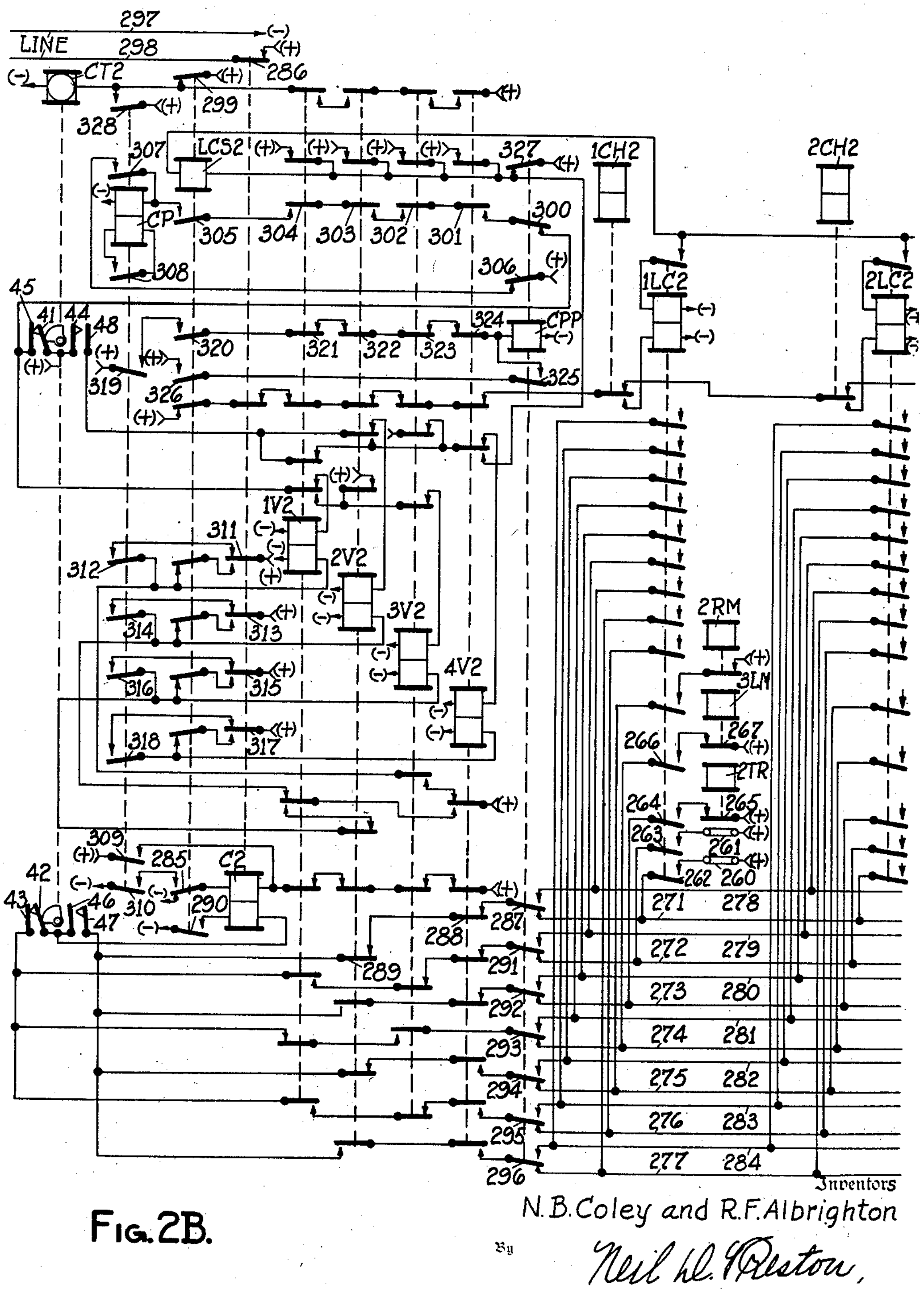

Having thus considered specifically the apparatus provided for the communication of controls from the control office to the field location, it is to be understood that a similar arrangement of apparatus is provided as shown in Figs. 2A and 2B for the communication of indications from the field location to the control office, the field location becoming the transmitter, the apparatus of which is illustrated in Fig. 2B, and the control office becomes the receiver, the apparatus of which is illustrated in Fig. 2A.

The mode of operation of the organization shown in Figs. 2A and 2B for the communication of indications from the field location to the control office differs from that which has been heretofore considered for the communication of controls from the control office to the field location, particularly in that the system is arranged for the scanning of the respective indications to be transmitted, rather than storing the codes for execution at the end of the cycle, and it is furthermore provided that a repeat of the operation of the stepping relays is made for the purpose of providing double the number of communication channels during an indication cycle of operation as compared to the seven communication channels provided during a control cycle.

Thus for the transmission of indications (see Fig. 2B), the relays CP and CPP are provided in addition to the general transmitting apparatus heretofore considered in order to facilitate the repeat of the operation of the stepper and of the operation of the timing device CT2.

Relays RM and LM which are shown in Fig. 2B are assumed to be signal stop repeater relays which are normally energized in accordance with their associated signals being at stop in a manner well known to those familiar with the art, and a track relay 2TR is provided which is assumed to be governed by the detector track section 2T of the track layout shown in Fig. 3.

The apparatus for the reception of indications as illustrated in Fig. 2A corresponds in general to the apparatus which has been heretofore described for the reception of controls except that there are certain differences in the control of the relays, and relays CP3 and CPP3 are provided for facilitating the repeat of the stepper operation for the reception of the second group of seven characters transmitted during an indication communication cycle of operation. Magnetic stick relays RMK, LMK, and TK, and associated indicator lamps RME, LME, and TE, respectively, are illustrated in Fig. 2A as being conditioned in response to indications communicated from the field location relative to the condition of the respective signals, and the occupancy of the track section 2T illustrated in Fig. 3.

With reference to Fig. 3, apparatus is shown for the checking of the proper execution of the respective codes received for the control of switch and signal control relays 4WZ4, 2RGZ4, 3LGZ4, and 2–3B. These switch and signal control relays have corresponding functions to those which have been heretofore described and which are illustrated in Fig. 1B, but their control circuits are modified to include checking means so as to permit the clearing of a signal governing entrance to a route only provided that the switch control relays for each track switch that has been controlled in setting up the route have responded properly to the switch control code that has been received. This checking is accomplished by the use of checking relays CK, CKP, and CKPP. A relay CK is provided for each track switch while the relays CKP and CKPP are provided for the system. The relays CK are magnetic stick relays that are normally in their picked up positions but are required to be knocked down and restored to their picked up position upon the reception of associated switch controls in order that a signal governing entrance over the associated track switch may be cleared in response to the transmission of a subsequent switch control cycle.

Other relays illustrated in Fig. 3 bearing letter reference characters comparable to relays which have been described as a part of the receiving apparatus shown in Fig. 1B have similar functions to those which have been described.

Having thus considered in general the organization of the system, a detailed consideration as to the circuits involved for the control of the respective relays will be hereinafter considered along with a description of the mode of operation of the system during typical operating conditions.

*Operation*

Before considering specifically the circuit organization and mode of operation under typical operating conditions, it is believed expedient to consider the mode of operation in general.

To thus consider the mode of operation in general for the transmission of a control, it can be assumed that a control is designated at the control office for transmission by the actuation of a switch or signal control lever SML or SGL (see Fig. 1A), and in accordance with the actuation of one of these levers, an associated relay CH is dropped away, and the dropping away of this relay is effective to cause the picking up of the associated relay LC, and the relay LCS. Upon the picking up of the relay LCS, the code oscillator CT is deenergized, and thus the control cycle of operation is initiated.

With reference to the diagram of Fig. 7, when the pendulum of the oscillator CT first swings through its center position, the opening of the contacts of the oscillator CT is effective to deenergize the first of the stepping relays, 1V, and similarly for each of the subsequent swings of the pendulum 388 in the same direction through the center position, an odd numbered stepping relay V is dropped away. Similarly upon the rotation of the pendulum 388 through center in the opposite direction to complete the first excursion of the pendulum, the second step is taken by the dropping away of the relay 2V. Thus, on subsequent similar operations of the oscillator pendulum 388 in the same direction through center, an even numbered step is taken by the dropping away of an even numbered stepping relay V.

It will be noted with reference to Fig. 7 that during the second excursion of the oscillator pendulum 388 from its initial position, the stepping relay 1V is picked up to condition this relay so that it can be used a second time for defining the beginning of a step. Thus with respect to the diagram of Fig. 7, the passing of the oscillator pendulum 388 through its center position at the beginning of the second excursion causes the dropping away of relay 3V, which in turn causes the picking up of the relay 1V, and the passing of the oscillator pendulum 388 through center in a similar manner for the third excursion is effective to drop away the relay 1V for the second time to define the fifth step taken by the stepping relay bank. It will be noted that similarly the relay 2V is picked up at the end of the second excursion of the oscillator pendulum 388, and this relay is thus conditioned so that it is dropped away to mark the sixth step upon the passing through center of the pendulum 388 of the oscillator CT upon completing the third excursion of the pendulum from its initial position. Similarly the relay 3V is indicated as being picked up in response to the dropping away of the relay 1V during the third excursion of the oscillator pendulum 388, and thus this relay is conditioned so that it can be deenergized for defining the seventh step to be taken when the oscillator pendulum 388 initially passes through center during the fourth excursion from the initial position.

From the operation of the stepping relay bank in response to the operation of the timing device CT as has been described, it will be seen that the order of actuation of the stepping relays V defines the respective seven steps of the system as follows:

| Step No. | Stepping relay positions |
|---|---|
| 1 | 1V down—4V up. |
| 2 | 2V down—4V up. |
| 3 | 3V down—4V up. |
| 4 | 4V down—1V up. |
| 5 | 1V down—4V down. |
| 6 | 2V down—4V down. |
| 7 | 3V down—4V down. |

It can thus be said that the respective steps are effectively coded in that they are made up of respective distinctive combinations of front and back contacts in seven different combinations, these combinations being so selected for transmission of code characters for example, by the contacts of the oscillator CT as to be permitted to be closed only during their respective assigned half cycle periods of the oscillator timing device CT. That is, with reference to the timing diagram of Fig. 7, each complete half cycle shown for the travel of the oscillator pendulum 388 represents a distinctive step and time period which is created by the contacts of the oscillator CT in combination with respective distinctive combinations of front and back contacts of the four stepping relays V.

It is by this circuit organization that the seven separate channels are set up for use in the application of the seven respective code characters to the line circuit in accordance with the controls that are designated, and the particular relay LC that is picked up governs the selection of code characters to be transmitted for the respective seven channels that have been formed. These circuits do not apply the code characters directly to the line circuit, but provide for the energization of the code transmitter relay C for each "mark" to be transmitted during the respective seven steps, and thus by the actuation of this code transmitter relay C, the respective seven characters can be selectively applied to the line circuit for transmission to the field location over any suitable line circuit communication system.

At the field location, the line relay L as is shown in Fig. 1B is normally energized, and the deenergization of this relay is effective to initiate the actuation of the stepping relay bank as timed by the code oscillator CT1. Thus the field stepper is not necessarily actuated at the same time as the stepper at the control office where propagation time along the line circuit is considered, but the stepper is actuated at the same rate as the stepper at the control office because of the code oscillators CT being accurately matched in their operating characteristics at the respective transmitting and receiving stations and therefore it is relatively immaterial as to whether or not the oscillator CT1 is started at the same time as the oscillator CT at the control office, or is started at some time interval later because of line propagation time delay. In accordance with the actuation of the contacts of the oscillator CT1 at the receiving station upon the pendulum of that oscillator swinging through its center position, the stepping relays 1V1, 2V1, 3V1, and 4V1 are actuated by a mode of operation comparable to that which has been considered for the stepping at the control office so as to set up seven respective steps for the reception of the message that has been transmitted.

A decoding relay M is picked up at the receiving station for each mark that is received during the particular one of the seven steps with which that relay M is associated, the picking up of this relay being rendered effective in response to the dropping away of the stepping relay for the particular associated step, provided the line relay L is picked up at this time. Each relay M when picked up is maintained energized by a suitable stick circuit until the end of the cycle, subsequent to the setting up of an execution period during which the respective switch and signal control relays are selectively energized in accordance with the code that has been received.

Although other systems of execution of the codes received may be employed, the embodiment of the present invention illustrated in Fig. 1B provides for an execution circuit affording a parity check of the code so as to eliminate to a large extent the possibility of the reception of a garbled code as being effective to actuate any switch or signal control relay. This parity check system requires the communication of codes always having an odd number of marks, and the system for the selection of codes for transmission at the control office is so arranged that each code transmitted comprises an odd number of marks. It is thus provided that should a single mark be lost in the transmission so as not to be received at the field location, the reception of an even number of marks would prevent execution of the code, and thus there would be no switch or signal control relay actuated as the garbled code would be detected by the parity check system in the execution circuits that the code was faulty. Similarly, if an additional mark were received by picking up energy by the line circuit from an extraneous source during a single period originally employed for the designation of a space, the reception of one additional mark would prevent the execution of the code at the end of the cycle from being effective to control any switch or signal control relay. It will thus be seen by this organization that any distortion of the code received at a receiving station must be in the order of the addition or subtraction of an even number of marks in order that the code may be received undetected as a distorted code and used for the control of a switch or signal control relay.

Having thus considered in a general manner the mode of operation of the system for the communication of controls from the control office to the field location, consideration will now be given as to the specific circuit organizations involved in providing the mode of operation that has been described.

*Initiation of control cycle*

Although it should be readily apparent to those skilled in the art that different systems of initiation of a control cycle which are known in the art may be employed with a system provided according to the present invention for the embodiment illustrated in Fig. 1A, there are no start buttons required, but the relays CH are so governed by polarized circuits as to be actuated whenever the associated switch or signal control lever is moved to a new position. For providing this mode of operation, the respective switch and signal control levers can be considered circuitwise as pole changing levers in that each time the lever is actuated to a new position the circuit for the associated change relay CH is pole changed through its stick circuit so as to cause that relay to be dropped away for initiation of a control cycle, restoration of the relay being effected by energy of the newly selected polarity upon the picking up of the associated relay LC when the cycle is actually initiated. The relay 4CH, which is associated with the switch control lever 4SML, is normally energized by a stick circuit extending from (+), including contact 60 of lever 4SML in its left-hand position, front contact 61 of relay 4CH, lower winding of relay 4CH, and contact 62 of relay 4SML in its left-hand position, to (−). Similarly, the relay 2–3CH, which is associated with the signal control lever 2–3SGL, is normally energized by a circuit extending from (+), including contact 63 of lever 2–3SGL in its center position, lower winding of relay 2–3CH, front contact 64 of relay 2–3CH and contact 65 of lever 2–3SGL in its center position, to (−).

If the lever 4SML is moved from its normal to its reverse position, for example, the circuit just described for the relay 4CH is pole changed by the shifting of the contacts 60 and 62 of the lever 4SML, and thus the relay 4CH is dropped away upon reversal of polarity through its windings.

Upon the dropping away of relay 4CH, assuming the system to be at rest at this time, a pickup circuit is closed for the relay 4LC extending from (+), including back contact 66 of relay LCS, front contact 67 of relay C, front contacts 68, 69, 70, and 71 of relays 1V, 2V, 3V, and 4V, respectively, back contact 72 to relay 4CH, and lower winding of relay 4LC, to (−). The picking up of this relay closes a stick circuit for its upper winding, including the winding of relay LCS, and extending from (+); including front contacts 73, 74, 75, and 76 of relays 4V, 3V, 2V, and 1V, respectively, connected in multiple, winding of relay LCS, front contact 77 of relay 4LC, and upper winding of relay 4LC, to (−). The picking up of relay LCS starts the stepping of the cycle by the deenergization of the oscillator CT upon the opening of back contact 78 through which the oscillator CT is normally energized.

The relays 4LC and LCS are maintained energized throughout the cycle by the stick circuit that has been described, and the relay 4LC in picking up is effective by the closure of front contact 79 to establish a pickup circuit for the relay 4CH extending from (+), including contact 60 of lever 4SML in its right-hand position, upper winding of relay 4CH, front contact 79 of relay 4LC and contact 62 of lever 4SML in its right-hand position, to (−).

Having thus considered specifically the mode of operation upon initiation of a cycle of operation in accordance with the actuation of the switch control lever 4SML to its right-hand position for designation of the track switch 4W to be operated to its reverse position, it should be readily apparent from the description as set forth, that a similar mode of operation is effected upon actuation of the lever 4SML in the opposite direction for the designation of the track switch 4W to be operated to its normal position from its reverse position, the actuation of the lever 4SML in either case being effective to pole change the relay 4CH, and thus cause that relay to be dropped away so as to initiate the control cycle.

The initiation of a control cycle for the transmission of a signal control is similarly effected in that the actuation of the three-position signal control lever 2–3SGL to any new position is effective to pole change the associated relay 2–3CH and thus cause that relay to be dropped away so as to effect the picking up of the relays 2–3LC and LCS. Thus, for example, the actuation of the lever 2–3SGL to its right-hand position for governing the clearing of signal 2 for eastbound traffic, pole changes the circuit for the lower winding of the relay 2–3CH which has been described as being normally energized through the center contacts 63 and 65 of the lever 2–3SGL. The pole changing of the lower winding of relay 2–3CH is effected in an obvious manner upon the shifting of the respective contacts 63 and 65 of the lever 2–3SGL to their right-hand positions, and the relay 2–3CH in dropping away closes a portion of the chain circuit for the control of relay 2–3LC at back contact 80 so as to provide that the relay 2–3LC can be picked up when the system is available for communication of the control that has been designated. Relay 2–3LC when picked up closes a restoration circuit for the normally energized relay 2–3CH at front contact 81, and the closure of the stick contact 82 of relay 2–3LC provides for the picking up of the relay LCS to initiate the stepping by the deenergization of the oscillator CT upon the opening of back contact 78.

In accordance with the picking up of the relay LCS at the control office, the shifting of its contact 83 opens a circuit that has been normally energized for the relay C so as to cause a relay C to drop away and open the line circuit by the opening of its front contact 84. The circuit by which the relay C has been normally energized extends from (+), through front contacts 85, 86, 87, and 88 of relays 4V, 3V, 2V, and 1V, respectively, upper winding of relay C and back contact 83 of relay LCS, to (−). The closure of front contact 83 of relay LCS conditions the circuit organization for the energization of the lower winding of relay C so that the relay C may be selectively energized for the respective code characters to be transmitted.

In accordance with the opening of the line circuit at front contact 84, the removal of energy from the line wires 89 and 90 provides for the dropping away of the normally energized line relay L at the field location (see Fig. 1B). Relay L in dropping away opens the circuit by which the oscillator CT1 has been maintained normally energized through front contacts 91 and 92 of relays L and CS, respectively, connected in series. Thus upon the initial dropping away of relay L at the beginning of a communication cycle, the stepping at the receiving station is initiated in accordance with the initiation of the operation of the timing device CT1.

The dropping away of the line relay L at the beginning of the cycle is also effective to cause the release of the normally energized cycle start relay CS by the opening of an obvious stick circuit for this relay at front contact 93. Relay CS when dropping away closes a pickup circuit for its back contact repeater relay CSP at back contact 94 so as to cause the relay CSP to be picked up and to remain picked up until the relay CS is again energized for the execution period at the end of the cycle. The relay CSP when picked up closes a shunt circuit for its lower winding at front contact 95 so as to give the relay slow drop away characteristics to hold over for the duration of the execution period at the end of the cycle in a manner to be more readily apparent as the description progresses.

*Stepping*

To consider first an operation of the stepping bank at the control office as is illustrated in Figs. 1A and 5, when the oscillator CT first passes through center it opens the contact fingers 41 and 45, which causes the dropping away of the first stepping relay 1V. The relay 1V has been maintained picked up by a stick circuit extending from (+), including the contact fingers 41 and 45 of the oscillator CT, front contact 96 of relay 1V, and upper winding of relay 1V, to (−). The relay 2V is maintained energized at this time by a stick circuit extending from (+), including front contact 97 of relay 3V, front contact 98 of relay 1V, front contact 99 of relay 2V, and upper winding of relay 2V, to (−). The relay 3V is maintained picked up at this time by a stick circuit which extends from (+), including front contact 100 of relay 2V, front contact 110 of relay 3V, and upper winding of relay 3V, to (−). Relay 4V is maintained picked up at this time by a stick circuit extending from (+), through front contact 97 of relay 3V, front contact 111 of relay 4V, and upper winding of relay 4V, to (−).

Of the stick circuits that have been described for the relays 2V, 3V, and 4V, only the stick circuit for relay 2V is opened by the dropping away of the relay 1V at front contact 98, but the closure of the contact fingers 44 and 48 when the oscillator passes through its center position is effective to close an auxiliary stick circuit for the relay 2V prior to the opening of front contact 98 of relay 1V so as to maintain the relay 2V energized, dependent upon the closure of the oscillator contacts 44 and 48, to thereby condition the relay 2V so that it can be dropped away when the oscillator next swings through its center position during the last half of the first excursion of its operation. The stick circuit by which the relay 2V is maintained picked up while the right-hand contacts of the oscillator CT are closed for the first time during the cycle extends from (+), including contact fingers 44 and 48 of oscillator CT, front contact 99 of relay 2V, and upper winding of relay 2V, to (−).

Upon the opening of the contact fingers 44 and 48 for the first time during the control cycle, the stick circuit just described for the relay 2V is opened, and this relay becomes dropped away to define the second step of the communication cycle. The opening of front contact 100 of relay 2V through which the stick circuit for the upper winding of relay 3V has been energized, does not cause the immediate release of the relay 3V, but conditions the relay 3V so that it is dependent upon energization through the contact fingers 41 and 45 of the oscillator CT. This circuit for the relay 3V extends from (+), including contact fingers 41 and 45 of the oscillator CT, back contact 96 of relay 1V, front contact 110 of relay 3V, and upper winding of relay 3V, to (−). By the establishment of this circuit, it is provided that the relay 3V is conditioned to be dropped away during the first part of the next excursion of the oscillator pendulum 388 when it passes through its center position and opens the contact fingers 41 and 45.

When the contact fingers 41 and 45 are opened during the first part of the second excursion of the oscillator CT, the dropping away of the relay 3V opens the stick circuit that has been described for the relay 4V at front contact 97, but the relay 4V is maintained energized through the right-hand oscillator contact fingers 44 and 48 by a circuit extending from (+), including contact fingers 44 and 48 of oscillator CT, back contact 99 of relay 2V, front contact 111 of relay 4V, and upper winding of relay 4V, to (−).

At the time of the dropping away of the relay 3V, however, a pickup circuit is closed for the relay 1V so as to condition that relay so that it can be used in the forming of a subsequent step in the operation of the stepping bank. Relay 1V is picked up under these conditions by the energization of a circuit extending from (+), including front contact 112 of relay 4V, back contact 113 of relay 3V, and lower winding of relay 1V, to (−).

Relay 1V is held up by this pickup circuit until the relay 4V is dropped away to open the circuit at front contact 112. Just prior to the relay 4V being dropped away, however, the pendulum 388 of the oscillator CT shifts so as to close its contact fingers 41 and 45, and thus the relay 1V is held on its stick circuit through front contact 96 and through the contact fingers 41 and 45 of the oscillator CT.

Relay 4V becomes dropped away upon the opening of its stick circuit when the pendulum 388 of the oscillator swings through its center position and opens the contact fingers 44 and 48 upon completion of the second excursion of the oscillator pendulum 388 during the stepping operations being considered.

The relay 4V when dropped away closed a pickup circuit for the relay 2V so that this relay can be conditioned to be dropped away during a comparable period in the operation of the oscillator CT for a subsequent excursion of its operating mechanism. Thus the relay 2V is picked up at this time by the energization of a circuit extending from (+), including back contact 112 of relay 4V, front contact 114 of relay 1V, and lower winding of relay 2V, to (−). When the pendulum 388 of the oscillator CT next passes through its center position, the closure of the contact fingers 44 and 48 is effective to establish a stick circuit for the relay 2V through its front contact 99, and thus the relay 2V is maintained picked up until the oscillator shifts in its position to open the contact fingers 44 and 48 for the third time during the cycle.

The opening of the contact fingers 41 and 45 for the third time during the cycle of operation under consideration is effective to cause the dropping away of the stepping relay 1V to effectively form the fifth step, and the dropping away of this relay, by the opening of front contact 114 in the pickup circuit for the relay 2V, conditions the relay 2V so that it is dropped away the next time that the pendulum 388 of the oscillator CT swings through its center position so as to open the contact fingers 44 and 48 for the third time since the initiation of the oscillator CT.

Relay 1V, in dropping away to form the fifth step, is effective to cause the picking up of the relay 3V to condition this relay so that it may be used in initiating the last step of the stepping operation. The circuit by which the relay 3V is picked up under these conditions extends from (+), including back contact 112 of relay 4V, back contact 114 of relay 1V, front contact 115 of relay 2V, and lower winding of 3V, to (−). This relay is maintained picked up subsequent to the opening of its pickup circuit by the dropping away of relay 2V by its stick circuit including front contact 110 of relay 3V, back contact 96 of relay 1V, and contact fingers 41 and 45 of the oscillator CT. Thus this stick circuit provides that the opening of the contact fingers 41 and 45 by the pendulum 388 of the oscillator passing through center at the beginning of its excursion of the oscillator, is effective to cause the dropping away of relay 3V, which in turn sets up the seventh step of the communication system.

Upon the dropping away of the relay 3V for forming the seventh step of the system, the stepping relays 1V, 2V, 3V, and 4V are all in their dropped away positions for the first time during the operation of the communication cycle, and thus by these relays being all in their dropped away positions, an energizing circuit is closed for the oscillator CT so as to restore the operating mechanism to its normally energized position. This circuit for the oscillator CT at the control office extends from (+), including back contacts 116, 117, 118, and 119 of relays 4V, 3V, 2V, and 1V, respectively, and winding of oscillator CT, to (−).

Having thus described specifically the circuit organization and mode of operation involved in the operation of the stepping relay bank at the control office for use in the transmission of controls, it is to be understood that a similar mode of operation is provided by the relays 1V1, 2V1, 3V1, and 4V1 (see Fig. 1B) at the field location for the reception of the controls that are transmitted over the line circuit, the stepping operations at the field location being initiated by the deenergization of the oscillator CT1 in a manner which has been described. Upon the dropping away of the relay 3V1 for the second time during the stepping operation to mark the beginning of the seventh step, the stepping relays are all in their deenergized positions for the first time during the operation of the stepping relay bank, and thus the oscillator CT1 has an energizing circuit closed for its winding so as to restore the operating mechanism to its normal position. The pickup circuit for the oscillator CT1 under these conditions includes the back contacts 120, 121, 122, and 123 of relays 1V1, 2V1, 3V1, and 4V1, respectively.

*Message transmission*

It has been pointed out that message transmission is accomplished by "mark" and "space" characters transmitted from the control office to the field location for the respective controls, one cycle of operation of the communication system being used for the transmission of each control.

The selection of the code characters used for transmission is in accordance with whichever one of the relays LC (see Fig. 1A) at the control office has been picked up. This is because each of the seven characters is determined by a circuit through a front contact of a relay LC, only one relay LC being picked up at a time as has been heretofore considered. Thus the relay 4LC, for example, is illustrated as having contacts capable of determining as to whether the respective seven characters transmitted during a control cycle are "marks" or "spaces" in accordance with a predetermined code. The first group of code characters transmitted are more particularly assigned to the coding of the particular device, and the last group of characters selected for transmission is indicative of the particular position to which the device is to be operated. Thus the relay 4LC, for example, selects a code for transmission, the first five characters of which are used to define the particular track switch 4 as being the track switch to be controlled, and the last two characters being used in defining the position to which the track switch 4W is to be operated.

For the transmission of a switch control for the track switch 4W, for example, the first four characters of the code are caused to be marks because of the connection of energy through front contacts 124, 125, 126, and 127 of relay 4LC to the respective code channel wires 131, 132, 133, and 134. Because of the fifth character of the code being a space, there is no energy applied to the fifth channel wire 135 by the relay 4LC, and energy is applied to the sixth or seventh channel wire 136 or 137 in accordance with whether the position of the track switch 4W is called for to be respectively normal or reversed. This is accomplished by the application of energy through front contacts 138 or 139 of the relay 4LC in accordance with the contact 140 of the switch lever 4SML being respectively in its left-hand or right-hand position.

It will be obvious from the circuit organization that has been described for the application of energy to the respective channel wires 131, 132, 133, 134, and 136 or 137, that this energy is applied to all wires simultaneously corresponding to steps during which marks are to be transmitted upon the picking up of the associated relay 4LC at the beginning of the cycle of operation. At the beginning of the cycle of operation, however, these seven channel wires are isolated circuit-wise from the windings of the code transmitter relay C, and it will be readily understood as the description progresses that energy from these respective wires is applied during the respective steps of the stepping relay bank selectively to the lowering winding of the relay C so as to pulse the relay C in accordance with the respective marks to be transmitted.

After the control cycle has been initiated, the closure of the contact fingers 46 and 47 (see Fig. 1A), when the oscillator pendulum 388 swings through center for the first time closes a pickup circuit for the relay C for the transmission of the first character of the code, if this character has been selected as being a mark. The relay C is energized under these conditions by feeding energy from the channel wire 131 through front contact 141 of relay 4V, front contact 142 of relay 2V, contact fingers 46 and 47 of oscillator CT, lower winding of relay C and front contact 83 of relay LCS, to (—). Upon the picking up of relay C by the energization of this circuit, the closure of front contact 84 applies energy to the line circuit comprising the line wires 89 and 90 extending to the field location to accomplish the transmission of a mark as the first character of the code to be transmitted during the cycle. Should the first character to be transmitted be a space, rather than a mark, the absence of energy as accomplished by predetermined code selections through the contacts of the relays LC applied to the channel wire number 131 obviously would prevent the picking up of the relay C and thus prevent the application of energy to the line circuit for the first time period of the code to be transmitted.

Upon the dropping away of the first step relay 1V, a circuit is conditioned for the transmission of a second mark so that upon the shifting of the oscillator pendulum 388 through its center position, the closure of contact fingers 42 and 43 can establish a circuit for relay C to govern the transmission of a mark as the second character of the code. Thus if a mark is to be transmitted for the second character of a code, energy is applied from the channel wire 132, through front contact 143 of relay 4V, front contact 144 of relay 3V, back contact 145 of relay 1V, contact fingers 42 and 43 of oscillator CT, lower winding of relay C, and front contact 83 of relay LCS, to (—). Should it be desirable to transmit a space as the second code character, there would be no energy applied to the channel wire 132, and therefore the relay C would be deenergized during the time period assigned to the transmission of the second code character to thereby form a space for that character.

Similarly, energy is applied from the respective odd numbered channel wires through the contact fingers 46 and 47 of the oscillator CT for the energization of the code transmitter relay C for each of the respective successive odd steps, and the energization of the winding C is accomplished in a similar manner for the even steps by circuits selected through the contact fingers 42 and 43 of the oscillator CT.

It will be noted that during the time for the transmission of the second character, the circuit for the control of the relay C that has been described for the transmission of the first character is opened by the opening of the contact fingers 46 and 47, and prior to the closure of these contact fingers again, the relay 2V becomes dropped away so as to open the circuit that has been described for the energization of the relay C for the first character of the code at front contact 142. Thus by a similar mode of operation, a new control circuit is selected by contacts of the stepper relays V for each successive character to be transmitted, and the circuit for the prior time interval of the cycle for the control of the relay C is opened so that the relay C can be energized for the transmission of a mark only by the feeding of energy from the channel wire corresponding to the channel step of the communication system being taken at that time.

The relay C can be picked up for the transmission of a mark as the third character of a code in accordance with energy feeding from the channel wire 133, through front contact 146 of relay 4V, back contact 147 of relay 2V, contact fingers 46 and 47 of the oscillator CT, lower winding of relay C, and front contact 83 of relay LCS to (—). The transmission of a mark as the fourth character of a code can be in accordance with the application of energy from the channel wire 134, through back contact 148 of relay 3V, front contact 149 of relay 1V, contact fingers 42 and 43 of oscillator CT, lower winding of relay C, and front contact 83 of relay LCS, to (—). A mark for the fifth character can be transmitted in accordance with the energization of the relay C from the channel wire 135, through back contact 150 of relay 4V, front contact 151 of relay 2V, contact fingers 46 and 47 of the oscillator CT, lower winding of relay C, and front contact 83 of relay LCS, to (—). A mark as the sixth character of the code can be transmitted in accordance with energy applied to the channel wire 136 and feeding through back contact 152 of relay 4V, front contact 153 of relay 3V, back contact 154 of relay 1V, contact fingers 42 and 43 of the oscillator CT, lower winding of relay C, and front contact 83 of relay LCS, to (—). Relay C can be picked up for the transmission of a mark for the seventh character in accordance with energy feeding from the channel wire 137 through back contact 155 of relay 4V, back contact 156 of relay 2V, contact fingers 46 and 47 of the oscillator CT, lower winding of relay C, and front contact 83 of relay LCS, to (—).

It will be noted from the description as it has been set forth relative to the operation of the relay C for the transmission of marks, that the duration of each mark is in accordance with the time of closure of the respective pairs of contact fingers of the oscillator CT. That is, the closure of a pair of contact fingers of the oscillator CT is effective to energize the code transmitter relay C to initiate the transmission of a mark code character, and the opening of those contact fingers is effective by the deenergization of the relay C to terminate the transmission of the mark.

The rate of transmission of the respective code characters is, of course, governed in accordance with the speed of operation of the relays, and one embodiment of the present invention constructed according to the circuit organization illustrated in Figs. 1A and 1B, is capable of transmitting at the rate of 1000 steps per minute which is such as to provide that the duration of each mark can be in the order of approximately 60 milliseconds. This rate of operation allows for a sufficient extra time factor to take care of the maximum variations in relay operation in accordance with variations in line propagation times, operating characteristics of relays due to temperature changes, etc.

Figure 8A:
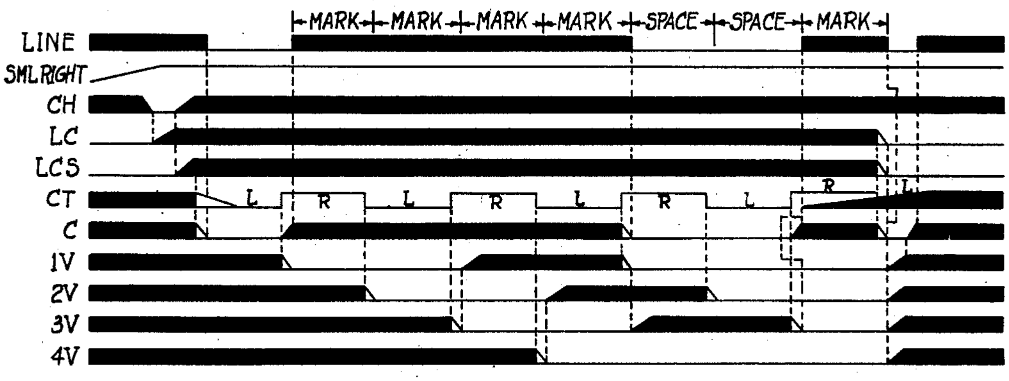
Figs. 8A and 8B are sequence charts illustrating approximate relative times of energization of the line circuit and the respective code communication relays that can be obtained during a typical cycle of operation of the communication system for the transmission of a specific switch control from the control office to the field location.
Figure 8B:

It has been pointed out that there is no appreciable time consumed in the shifting from one time period to the next as determined by the respective pairs of contact fingers on the oscillator CT, and it is illustrated according to the timing charts of Figs. 8A and 8B that the contact fingers of the oscillator CT are so adjusted as to close one set of contact fingers at substantialtially the same time as the other contact fingers are opened as the oscillator pnedulum 388 rotates through its center position. Thus it can be said that for practical purposes, there is no time interval between the respective code characters that are transmitted over the line circuit, and when successive marks are transmitted, the oscillator pendulum 388 in passing through its center position shifts practically instantaneously from one energized circuit for the relay C to another, so that the code transmitter relay C never has a chance to be dropped away to open its front contact 84 in the line circuit so long as successive marks are transmitted during the transmission of a code.

*Reception of controls*

In accordance with the reception at the field location of the code characters that have been transmitted, the line relay L (see Fig. 1B) registers at the field location, with respect to the decoding apparatus, as to whether marks or spaces are being received during the respective time periods of the code. Thus a mark relay M is picked up for each step in response to the actuation of the corresponding stepping relay, provided that the line relay L is picked up at that time to register that a mark is being transmitted over the line circuit during that time interval. If the line relay L is in its dropped away position during any particular step because of the reception of a space character, the relay M for that step does not become picked up. In other words, the respective characters are decoded as mark or space characters in accordance with whether or not the relays M for the corresponding steps are picked up when the steps are taken.

It is therefore provided that upon the dropping away of the first stepping relay 1V1 (see Fig. 1B) as has been described when considering the stepping operation of the system, the relay 1M is picked up, provided the line circuit is energized at this time. The pickup circuit for the relay 1M extends from (+), including front contact 157 of relay L, contact fingers 46 and 47 of the oscillator CT1, back contact 158 of relay 1V1, front contact 159 of relay 2V1, front contact 160 of relay 3V1, front contact 161 of relay 4V1, and lower winding of relay 1M, to (−).

If a mark is received during the second step, the relay 2M is picked up. The circuit for the energization of the relay 2M under these conditions extends from (+), including front contact 157 of relay L, contact fingers 42 and 43 of oscillator CT1, back contact 162 of relay 1V1, back contact 163 of relay 2V1, front contact **163*a* of relay 3V1, front contact 164 of relay 4V1, and lower winding of relay 2M**, to (−).

Upon the dropping away of the relay 3V1 to mark the beginning of the third time period in the reception of a code at the field location, the relay 3M is picked up, if a mark is received during that time period. The circuit for the energization of relay 3M extends from (+), including front contact 157 of relay L, contact fingers 46 and 47 of oscillator CT1, back contact 165 of relay 2V1, back contact 166 of relay 3V1, front contact 167 of relay 4V1, and lower winding of relay 3M, to (−).

Upon the dropping away of the relay 4V1 to mark the beginning of the fourth time period in the reception of a code at the field location, the relay 4M is picked up, if a mark is received during that time period. The circuit for the energization of relay 4M extends from (+), including front contact 157 of relay L, contact fingers 42 and 43 of oscillator CT1, front contact 162 of relay 1V1, back contact 168 of relay 4V1, and lower winding of relay 4M, to (−).

If the line circuit is energized at the time when the fifth step is taken, the relay 5M is picked up. The pickup circuit for the relay 5M extends from (+), including front contact 157 of relay L, contact fingers 46 and 47 of oscillator OT1, back contact 158 of relay 1V1, front contact 159 of relay 2V1, back contact 169 of relay 4V1, and lower winding of relay 5M, to (−).

Relay 6M can be picked up during the sixth step if the line circuit is energized in accordance with the energization of a circuit extending from (+), including front contact 157 of relay L, contact fingers 42 and 43 of oscillator CT1, back contact 162 of relay 1V1, back contact 163 of relay 2V1, front contact **163*a* of relay 3V1, back contact 164 of relay 4V1, and lower winding of relay 6M**, to (−).

If a mark is received on the seventh step, the relay 7M is picked up upon the dropping away of the relay 3V1 to mark the seventh step. The circuit for the energization of relay 7M extends from (+), including front contact 157 of relay L, contact fingers 46 and 47 of oscillator CT1, back contact 165 of relay 2V1, back contact 166 of relay 3V1, back contact 167 of relay 4V1, and lower winding of relay 7M, to (−).

As these message receiving relays M are respectively picked up during progress of the communication cycle, they are maintained in their picked up positions until the end of the cycle of operation by respective obvious stick circuits, the stick circuits for the odd numbered message relays M being energized through front contact 170 of relay CSP, and the stick circuits for the even numbered message relays M being energized through front contact 171 of relay CSP.

Upon the closing of the contact fingers 41 and 45 of the oscillator CT1 for the last time during the cycle of operation, a pickup circuit is closed for the relay CS so as to cause that relay to pick up to initiate a period for the execution of the particular control code that has been received. The pickup circuit for the relay CS extends from (+), including contact fingers 41 and 45 of the oscillator CT1, back contacts 172, 173, 174, and 175 of relays 1V1, 3V1, 4V1, and 2V1, respectively, and lower winding of relay CS, to (−).

To consider the execution of a typical code, it will be assumed that the code "mark-mark-mark-mark-space-space-mark" has been transmitted for the power operation of the track switch 4W to its reverse position. Thus upon the reception of this code, the relays 1M, 2M, 3M, 4M, and 7M (see Fig. 1B) are picked up in accordance with the mode of operation of the decoding circuits as they have been described, and upon the picking up of the relays CS to initiate the execution period at the end of the control cycle, the relay 4WZ is energized with a polarity to cause the actuation of its contacts to their dropped away positions. The circuit by which the relay 4WZ is energized at this time extends from (+), including front contact 176 of relay CS, front contact 177 of relay CSP, front contacts 178, 179, 180, and 181 of relays 1M, 2M, 3M, and 4M, respectively, back contacts 182 and 183 of relays 5M and 6M respectively, front contact 184 of relay 7M, front contacts 185, 186, 187, and 188 of relays 1M, 2M, 3M, and 4M respectively, back contacts 189 and 190 of relays 5M and 6M respectively, front contact 191 of relay 7M, front contact 192 of relay 4WZ, and upper winding of relay 4WZ, to (−). The actuation of the relay 4WZ to its dropped away position by the energization of this circuit opens the circuit that has been described at front contact 192 of relay 4WZ so as to leave the relay 4WZ in its dropped away position and deenergized.

It will be noted that the code that has been considered as being received has an odd number of marks in it, and in accordance with the circuit organization for providing a parity check, the code received meets the requirements of the check by having this odd number of marks. If, for some reason, one of these marks should not have been received, the above described execution circuit for the relay 4WZ could not have been closed. Thus, for example, if the relay 7M had not been picked up for the last mark, the failure of front contact 184 of relay 7M to be closed would have prevented the feeding of energy to any application relay. It will be found that a similar condition is true if any one of the other marks should have not been received at the field location. For example, if the relay 4M had not been picked up the execution circuit would have been open at back contact 184 of relay 7M to prevent the energization of the rely 4WZ or the energization of any other application relay. It is believed that it should be readily apparent that the circuit organization is such that a code comprising any even number of marks cannot be executed. It will be noted that the output wire 193 of the parity check portion of the execution circuit feeds all of the control relays that may be selectively governed by the reception of the respective control codes, and thus this condition that has been described with respect to the control of the execution for the switch control relay 4WZ is similarly effective for the operation of other application control relays so that an odd number of marks is required to be present in the code in order that the code may be effective for the control of any application relay.

If the code transmitted is for the clearing of an eastbound signal 2 (traffic to the right), the relay 2RGZ at the field location is picked up, and the code transmitted for the picking up of this relay is selected for transmission at the control office in a manner which has been described so that the characters "space-space-mark-mark-space-mark-space" are transmitted. This code is transmitted from the office when relay 2–3LC is picked up, and lever 2–3SGL is in its right-hand position (see Fig. 1A). Upon the reception of this code at the field location, the relays 3M, 4M, and 6M are picked up, and during the execution period the relay 2RGZ is picked up. The circuit for the energization of the relay 2RGZ (see Fig. 1B) during the execution period extends from (+), including front contact 176 of relay CS, front contact 177 of relay CSP, back contact 178 of relay 1M, back contact 194 of relay 2M, front contact 180 of relay 3M, front contact 181 of relay 4M, back contact 182 of relay 5M, front contact 183 of relay 6M, back contact 184 of relay 7M, back contact 185 of relay 1M, back contact 195 of relay 2M, front contact 196 of relay 3M, front contact 197 of relay 4M, back contact 198 of relay 5M, front contact 199 of relay 6M, back contact 200 of relay 7M, and upper winding of relay 2GRZ, to (—).

Should the signal control designated for transmission have been for the control of a signal for governing westbound traffic, the execution circuit would have been the same as that which has been described for the control of signal 2, except that after the front contact 182 of relay 5M, back contact 201 would have been included in the parity check circuit, and the circuit would have been routed through front contact 198 of relay 5M, back contact 202 of relay 6M, and back contact 203 of relay 7M, to the upper winding of relay 3LGZ.

Should the signal control lever 2–3SGL be actuated to its center position for designation of the transmission of a stop control code for the signals associated with that lever, the code transmitted would comprise the characters "space-space-mark-mark-space-space-mark." Upon the reception of this code at the field location, the stop control relay 2–3B would be picked up by an execution circuit extending from (+) including front contact 176 of relay CS, front contact 177 of relay CSP, back contacts 178 and 194 of relays 1M and 2M respectively, front contacts 180 and 181 of relays 3M and 4M respectively, back contacts 182 and 183 of relays 5M and 6M respectively, front contact 184 of relay 7M, back contacts 185 and 195 of relays 1M and 2M respectively, front contacts 196 and 197 of relays 3M and 4M respectively, back contacts 198 and 199 of relays 5M and 6M respectively, front contact 204 of relay 7M, and winding of relay 2–3B, to (—).

Having thus described specifically how the system is adapted to the communication of switch and signal controls from a control office to a field location so as to selectively energize relays 4WZ, 3LGZ, 2RGZ, and 2–3B, it is to be understood that these relays may be used in controlling the switches and signals in accordance with the usual practice, and in a manner more specifically illustrated and to be hereinafter considered with reference to Fig. 3.

*Control cycle termination*

The dropping away of the relays C and LCS (see Fig. 1A) at the control office at the end of the transmission of a control cycle is effective to restore the stepping relays to their normally energized positions. The relay LCS is dropped away at that time because of the last step having been taken so as to remove energy from the relay LCS as fed through any one of the front contacts 73, 74, 75, or 76 of the stepping relays 1V to 4V inclusive, and the relay LCS is actually deenergized at the time interval when the oscillator CT opens its contact fingers 44 and 48 for the last time during the cycle of operation. Relay LCS is energized just prior to the opening of these contact fingers by a circuit extending from (+), including contact fingers 44 and 48 of oscillator CT, back contact 99 of relay 2V, back contact 111 of relay 1V, winding of relay LCS, and the upper winding of one of the relays LC, to (—).

It is thus provided that the relay LCS is dropped away when the oscillator pendulum 388 passes through center for the last time during the cycle, and the code transmitter relay C may have been in its picked up or dropped away position at this time in accordance with whether the last code character transmitted was selected as being a mark or a space. In any event, if the relay C had been picked up for the transmission of a mark as the seventh character of the code, it would be deenergized at the same time as the deenergization of the relay LCS, and therefore it can be said that a pickup circuit is closed for the stepper relays immediately upon the pendulum 388 of the oscillator CT passing through center for the last time during a communication cycle of operation.

Thus the relay 1V is picked up by the energization of its lower winding through back contact 204*a* of relay LCS and back contact 206 of relay C. The closure of corresponding contacts 207 and 208 provides for the picking up of relay 2V by the energization of its lower winding; the closure of back contacts 209 and 210 provides for the energization of the lower winding of the relay 3V; and the closure of back contacts 211 and 212 provides for the energization of the lower winding of relay 4V. The lower windings of these relays are adapted for quick energization by being of relatively low resistance in order to reduce to a minimum the time required for the picking up of the stepper relays. It will be noted that these same windings were used in the picking up of the relays 1V, 2V, and 3V for the second time during the cycle of operation in order particularly so as to have these relays conditioned so that their core structures are substantially saturated prior to each time when the relays are dropped away for stepping purposes. It has been pointed out that this is in order to be assured of a standard time of operation, irrespective of variations in voltage regulation over a relatively wide range of operating voltages that may be applied to the relays. Obviously it is undesirable from the standpoint of the heat generated in the low resistance winding to keep this winding steadily energized for the period of time when the system is at rest, and thus the stepping relays 1V, 2V, 3V, and 4V when picked up at the end of the cycle of operation are maintained energized by their relatively high resistance stick circuits, and the pickup circuits that have been described for these relays are respectively opened at the back contacts 206, 208, 210, and 212, of relay C. This is because the relay C is picked up as soon as the stepping relays have all been actuated to their picked up positions by a circuit which has been described as being normally effective for the energization of the upper winding of the relay C. Relay C can also be considered as having relatively high and low resistance upper and lower windings respectively, in order that it may be quick in operation during a communication cycle, but yet not be overheated when the system is at rest.

It will be noted that the energization of the oscillator CT is rendered effective upon the dropping away of the last step relay 3V (second time operated) by the closure of a circuit that has been described extending through back contacts of all of the stepping relays connected in series. From the mode of operation that has just been described for the restoration of the stepping relays V to their picked up positions, it will be readily apparent that the back contact 78 in the circuit for the control of the oscillator CT is closed prior to the picking up of the stepping relays V, and thus the oscillator CT is maintained normally energized through the back contact 78 of relay LCS. It will also be readily apparent that the opening of the circuit by which the relay LCS has been energized during the cycle also opens the stick circuit for the relay LC that has been picked up for determining the code for transmission, and thus such relay LC is dropped away at the time of dropping away of the relay LCS. Upon the picking up of the relay C at the end of a communication cycle, the closure of its front contact 84 completes the restoration of the apparatus at the control office to its normally at rest condition, and the energization of the line wires 89 and 90 extending to the field location is effective to cause the completion of cycle termination at the field location.

Considering now cycle termination at the field location, the oscillator CT1 becomes energized at the end of the cycle in accordance with the last step relay 3V1 (second time operated) having been dropped away in a manner comparable to that described as being effective at the control office. At the field location, the passing of the oscillator pendulum 388 through center for the last time of the cycle closes a pickup circuit for the lower winding of relay CS. This circuit extends from (+) including contact fingers 41 and 45 of the oscillator CT1, back contact 172 of relay 1V1, back contact 173 of relay 3V1, back contact 174 of relay 4V1, back contact 175 of relay 2V1, and lower winding of relay CS, to (−). When the relay L is picked up in accordance with the restoration of energy to the line wires 89 and 90, the closure of front contact 93 establishes a stick circuit by which the relay CS is maintained normally energized. Relay CS in picking up opens the circuit for its repeater relay CSP at back contact 94, but the relay CSP is maintained energized a little longer by reason of energy applied to the upper winding of the relay through back contact 213 of relay 4V1. This tends to lengthen the execution time period for the control of the respective switch and signal application relays. The maintaining of the relay CSP energized in this manner also ensures the picking up of the stepping relays because of the inclusion of front contacts of relay CSP in their pickup circuits.

The picking up of the stepping relays 1V1, 2V1, 3V1, and 4V1 at the field location at the end of a communication cycle is rendered effective upon the restoration of the line relay L to its normally energized position, and at this time, the lower winding of the relay 1V1 is energized through front contact 214 of relay L, front contact 215 of relay CS, front contact 216 of relay CSP, and the lower winding of relay 1V1. Similarly the relay 2V1 is picked up by energy feeding through corresponding contacts 217, 218, and 219 of relays L, CS, and CSP respectively; relay 3V1 is picked up by energy feeding through contacts 220, 221, and 222 of relays L, CS, and CSP respectively; and relay 4V1 is picked up by energy feeding through front contacts 223, 224, and 225 of relays L, CS, and CSP respectively. The stepping relays, when picked up, are maintained normally energized through stick circuits for their relatively high resistance upper windings comparable to circuits which have been described for the normal energization of the stepping relays V at the control office. The lower windings of the stepping relays 1V1, 2V1, 3V1, and 4V1 at the field location have relatively low resistance so as to provide for quick pickup and quick saturation of the cores of the relays for the same purposes that have been pointed out with respect to corresponding relays at the control office. These pickup windings are only momentarily energized, because as soon as the stepping relays are picked up, the opening of back contact 213 of relay 4V1 deenergizes the relay CSP, and the dropping away of this relay opens the pickup circuits for the relay 1V1, 2V1, 3V1, and 4V1 at front contacts 216, 219, 222, and 225, respectively.

The opening of front contact 177 of relay CSP terminates the execution period at the end of the cycle, and the opening of front contacts 170 and 171 of relay CSP deenergizes the stick circuits for the respective relays M that may have been picked up during the communication cycle so as to cause these relays to be restored to their normally deenergized positions. The dropping away of the relays M completes the restoration of the apparatus at the field location to its normal, at rest, condition.

*Switch execution check*

The execution circuits that have been described with reference to Fig. 1B simply provide for the selective energization of the respective switch and signal control application relays in accordance with the codes received, without any consideration being given as to checking the integrity of the response of the switch control relays to their respective codes as a basis of permitting the clearing of a signal, only provided that the control relays for the track switches of the route have been actuated to their positions in correspondence with the respective switch control codes that have been received.

With reference to Fig. 3, a circuit organization is provided for checking the positioning of the switch control relays WZ for the respective track switches in a track layout in correspondence with the positions of the decoding relays M. In other words, if the positioning of the decoding relays M is such as to call for a track switch to be operated to its reverse position, for example, it is checked that the switch control relay WZ for that track switch is properly actuated to govern the power operation of that track switch to its reverse position. The system is so organized that should a switch control relay WZ fail to be positioned in correspondence with the particular code received, there can be no subsequent actuation of a signal control relay to provide for the clearing of a signal, because of the possibility that the route may not be in proper alignment for the route that was intended to be set up.

This checking of the operation of the switch control relays is accomplished by a relay CK that is provided for each switch, together with system check repeater relays CKP and CKPP. The relays CK are magnetic stick relays, and they are required to be actuated to their dropped away and subsequently picked up positions whenever a switch control is received for the corresponding track switch. The neutral relays CKP and CKPP are used primarily in checking the operation of the respective check relays CK to see that they function properly. These relays are also required to be actuated each time that a switch control communication cycle is received.

To consider more specifically the circuit organization for providing the above described general mode of operation for checking the proper execution of switch controls, consideration will be given to the transmission of the switch control that has been considered in detail for the power operation of the track switch 4W to its reverse position. For the purpose of simplification of consideration of the circuit organizations involved, the portion of the execution circuits selected by the relays M is made the same in Fig. 3 for the control of the switch and signal control relays as that which is shown in Fig. 1B, and which has been described in detail, and thus similar reference characters are applied to the contacts of the relays M shown in Fig. 3 for that portion of the execution circuits in order that the description as it has been set forth may be applied to the circuit organization of Fig. 3 so that it will be unnecessary to consider the decoding in detail for the organization according to Fig. 3 with respect to selections through these relays M.

In Fig. 3, the switch control relay 4WZ4 is energized as shown in Fig. 1B for relay 4WZ up to front contact 192 of relay 4WZ4, and from there energy is fed through back contact 226 of relay 4CK and front contact 227 of a suitable lock relay LR, rather than being fed directly to the upper winding of the switch control relay as is done in the circuits according to Fig. 1B. Thus, it is required that the check relay 4CK which is provided for governing the energization of the relay 4WZ4 of Fig. 3, must be energized with a polarity to actuate its contacts to their dropping away positions before the associated switch control relay 4WZ4 can be energized. This is true irrespective of whether the switch control relay is to be energized for actuation of its contacts to their picked up or dropped away positions. If the relay 4WZ4 were to be picked up, the pickup circuit would extend through the back contact 228 of the check relay 4CK.

It is thus provided that the relay 4CK is the first relay to be actuated during the execution period at the end of the switch control cycle of operation under consideration, and inasmuch as this rleay 4CK is normally in its picked up position, it is required that it be actuated to its dropped away position so as to close the back contacts 226 and 228. The energization of the relay 4CK is through the same decoding contacts of the relays M as the relay 4WZ4, except that contacts of the relays 6M4 and 7M4 are not included in the knockdown circuit for the relay 4CK as it is the purpose of this circuit to merely select the relay CK associated with the switch control relay WZ that is to be controlled. Thus the upper winding of relay 4CK is energized from back contact 189 of relay 5M4 through front contact 229 of relay 4CK, upper winding of relay 4CK, back contact 230 of relay CKP and front contact 231 of relay CKPP.

The relay CKP is a normally energized relay, but it has been dropped away at an earlier time in the communication cycle, and the relay CKPP is a normally deenergized relay, but is has been picked up at an earlier time in the cycle.

Relay CKP is normally energized by a stick circuit for its lower winding extending from (+), including back contact 234 of relay 1M4, front contact 232 of relay CKP and lower winding of relay CKP, to (−). Energy is also applied to this circuit by front contact 235 of relay CS, or through the front contacts 236 and 237 of relays 4V4 and 3V4 connected in series. The relay CS is dropped at the beginning of the cycle as has been described, and thus the front contact 235 in the circuit for relay CKP is opened first, and, if the control cycle is for the transmission of a switch control code, the first character transmitted is always a mark, and thus the relay 1M4 is picked up so as to open back contact 234. If, however, a control cycle is for the communication of a signal control, the first character transmitted is always a space, and thus the back contact 234 remains closed so as to maintain the relay CKP picked up. If it is assumed that a switch control cycle is transmitted, after the contacts 234 and 235 have been opened, the dropping away of the relay 3V4 for initiation of the third step is effective to deenergize the check repeater relay CKP by the opening of front contact 237.

The check repeater relay CKPP, which is normally deenergized, is picked up, only for a switch control cycle, upon the closure of front contact 238 of relay 1M4. This is before the relay CKP has been dropped away, and the picking up of the relay CKPP is through front contact 239 of relay CKP. The picking up of relay CKPP establishes a stick circuit by the closure of front contact 240 shunting front contact 239 of relay CKP out of the circuit just described.

In accordance with the actuation of the relay 4CK to its dropped away position, the circuit that has been described for the upper winding of the relay 4WZ4 can be closed at back contact 226, if it is a reverse switch control that is assumed to be received for the track switch 4W, or if the switch control assumed to be received is for the power operation of the track switch 4W to its normal position, the circuit for the lower winding can be closed through back contact 228 of relay 4CK.

In accordance with the relay 4CK having been actuated to its dropped away position, energy is applied to the pickup circuit for the upper winding of relay CKP at back contact 242 so that the relay CKP is restored to its picked up position. The relay CS has been restored to its picked up position in accordance with the passage of the pendulum 388 through center for the last time during the cycle, and therefore a stick circuit is established through front contact 235 of relay CS and front contact 232 of relay CKP so as to maintain the relay CKP in its picked up position. It should be readily apparent from the pickup circuit provided for the relay CKP, that such relay is restored to its normally energized position during the execution period of each switch control cycle of operation in accordance with the actuation of the particular switch control check relay CK for the particular switch involved in the switch control that is communicated, back contacts of each of the relays CK for the respective track switches being included in multiple in the pickup circuit for the relay CKP. This pickup circuit can also be energized, in case there has been a failure of the apparatus to properly respond, and a failure of the check to be established, by the actuation of the restoration push button PB which may be at the field location, or may be more conveniently located at the control office, and control the relay CKP remotely by the assignment of a distinctive control code as is indicated by the dotted portion XX of the circuit connection the push button PB with the upper winding of the relay CKP.

When the switch control relay 4WZ4 has been actuated during the execution period into correspondence with the position of that relay called for by the code received, a circuit is closed for the lower winding of the check relay 4CK so as to cause that relay to be picked up. If the relay 4WZ4 is actuated to its dropped away position in accordance with the reception of a reverse switch control code, the closure of its back contact 241 establishes that the lower winding of relay 4CK must be energized by the corresponding reverse switch control code in order to be actuated to its picked up position. If, however, the code received is for the normal control of the track switch 4W, the relay 4WZ4 is energized with a polarity to cause that relay to be picked up, and the same code that is used for the picking up of the relay 4WZ4 is applied to the lower winding of the check relay 4CK through front contact 241 of relay 4WZ4 to check that the relay 4WZ4 has responded in correspondence with the normal switch control code that has been received. In addition, the picking up of the relay 4CK is dependent upon the circuit for the lower winding feeding through front contact 230 of relay CKP and front contact 231 of relay CKPP to check that these relays have been properly actuated during the cycle.

It will be noted by the circuit organization that has been described for the checking of the execution of a switch control code, that the relay CK that is provided for the particular track switch involved is restored to its picked up position, and in accordance with that relay CK having been actuated during the control cycle, it has been possible to restore the relay CKP to its normally energized position, and thus by the checking on a subsequent signal control cycle of communication that the relay CK has been picked up and the relay CKP has been restored to its normally energized position, it is checked that the switch control for the prior cycle has been properly executed in that the switch control relay WZ for that track switch has responded in correspondence with the switch control code that has been set up in the bank of decoding relays M.

Thus the signal control relay 2RGZ4, for example, has its upper winding energized through front contacts 243 and 244 of relays 4CK and CKP, respectively, to check that the relay 4WZ4 has properly responded to the switch control code transmitted during a prior switch control cycle of operation. If other track switches were included in a route over which the signal 2 governs, the circuit for the energization of the upper winding of relay 4WZ4 would have included therein a front contact of the switch control check relay CK for each of the track switches for the route governed by the signal 2. Similarly, the relay 3LGZ4 which is provided for the clearing of signals governing westbound traffic is selected through front contacts 245 and 246 of relays 4CK and CKP. Each of the signal control relays 2RGZ4 and 3LGZ4 is provided with a stick circuit provided in the usual manner for the slotting of the associated signal so as to make the restoration of that relay dependent upon the passage of a train, or dependent upon the transmission of a stop control so as to cause the picking up of the relay 2–3B. The stick circuit for the lower winding of relay 2RGZ4 extends from (+), including front contact 247 of relay 2RGZ4, back contact 248 of relay 2–3B, and front contact 249 of relay 2TR connected in multiple with back contact 250 of the track repeater relay 2TP, to (−). A similar stick circuit for the relay 3LGZ4 extends through the front contact 251 of that relay and includes back contact 248 of relay 2–3B and front contacts 249 and 250 of relays 2TR and 2TP respectively, connected in multiple.

The control of the respective track switches and signals in accordance with the control of the application relays WZ and GZ can be in accordance with the usual practice well known to those familiar to the art, thus the control of the switch machine 4SM is indicated by the dotted line 252 as being dependent upon the pole changing of the contacts 253 and 254 of the relay 4WZ4. The control of the signals is indicated by the dotted line 255 as being accomplished by the closure of front contact 256 of relay 2RGZ4 for governing eastbound traffic and by the closure of front contact 257 of relay 3LGZ4 for governing signals for westbound traffic.

*Transmission of indications*

For the transmission of indications, according to the present invention, a separate indication communication system is employed from that which is used for the communication of controls. Thus the communication of indications is independent of the communication of controls, there being separate stepping relay banks, oscillator timing devices, decoding relays, start relays, etc.

Inasmuch as the general mode of operation of the stepping relays, and other features of the indication communication system is similar to that which has been specifically considered for the communication of controls with reference to Figs. 1A and 1B, specific description of the apparatus of Figs. 2A and 2B will be more particularly limited to the manner in which that apparatus differs in its structure and mode of operation from the apparatus that has been already described for the communication of controls with reference to Figs. 1A and 1B.

For the embodiment of the invention shown in Figs. 2A and 2B, it is assumed that there are more indications to be transmitted from the single field location to the control office than can be transmitted during any one indication communication cycle of operation of the communication system, so thus it is assumed that the indications are divided into a plurality of groups, each group comprising only a number of distinctive indications that can be communicated during a single indication cycle of operation. Each of these groups of indications has associated therewith a relay LC and a relay CH which acts to initiate the communication system into a cycle of operation when there are indications to be transmitted in much the same manner as has been described by which corresponding relays are used at the control office for initiating the system into a cycle of operation for the transmission of a control that has been designated. The relays LC of the system according to Fig. 2B are connected in a chain circuit organization comparable to that which is shown in Fig. 1A for the transmission of controls, and the relay LCS2 of Fig. 2B is comparable to the relay LCS of Fig. 1A. This organization is so arranged that only one relay LC can be picked up at a time, and any one relay LC when picked up is maintained energized throughout the cycle of operation for the communication of indications, and the code characters transmitted are selected through front contacts of that relay LC, energy being applied or not to respective channel wires, in accordance with the condition of the particular device that is to be indicated at the control office.

Because there are generally a larger number of indications to be communicated than controls, the indication communication apparatus of Figs. 2A and 2B differs from the control communication apparatus of Figs. 1A and 1B, particularly in that there is a complete repeat of the stepping operations during each indication communication cycle so that 14 channels of communication are formed, rather than the 7 channels used for the transmission of controls, with the same number of stepping relays in the stepping bank. This repeat in transmission is accomplished in accordance with the operation of the relays CP and CPP (see Fig. 2B). The relay CP is picked up upon completion of transmission of the first half of the cycle of operation, and this relay when picked up initiates the second half of the indication cycle and also causes the picking up of its repeater relay CPP to select a second group of channel wires for connection through circuit selections of the stepping relays to the code transmitter relay C2.

The first group of characters transmitted during an indication cycle is used for indication station registration at the control office, and this group of characters is distinctive in accordance with the particular relay LC2 (see Fig. 2B) with which it is associated. Thus, for example, the relay 1LC2 when picked up determines that the first two characters transmitted are marks in accordance with energy applied through the code determining jumpers 260 and 261 which connect energy through the respective front contacts 262 and 263 of relay 1LC2 to the first and second channel wires 271 and 272, respectively. The first indication to be transmitted in accordance with the relay 1LC2 being picked up is an indication of the condition of the track relay 2TR which is provided for the detector track section of the simple track layout illustrated in Fig. 3. Thus if the track relay 2TR (see Fig. 2B) is picked up, energy is applied to the third channel wire 273 through front contact 264 of relay 1LC2 and front contact 265 of relay 2TR. Similarly, the next device to be indicated governs the energization of the next channel wire 274 through front contact 266 of relay 1LC2. This device to be indicated is illustrated in Fig. 2B as being the relay 3LM which is a normally energized signal repeater relay which is energized whenever its associated signal 3 of Fig. 3 is at stop. Thus, the normal condition of signal 3 is at stop, and therefore according to Fig. 2B, relay 3LM is picked up so that energy is applied to front contact 266 of relay 1LC2 through front contact 267.

Having thus described specifically how a particular registration code is determined for transmission, and how specific indication codes are determined, it should be readily apparent that the selection of code characters for transmission of other indications is provided in the same manner as has been described for the track and signal indications relative to track section 2T and signal 3, respectively. The number of indication station registration characters required is, of course, dependent upon the number of different indication stations which are required, a sufficient number of registration characters being provided so as to provide a distinctive registration code to be determined by each of the relays LC2 that is required. Additional indications are effective to govern the respective code characters transmitted in accordance with the selective application of energy to the channel wires 275, 276, 277, 278, 279, 280, 281, 282, 283, and 284. The numerical order of these reference characters is in correspondence with the numerical order in which the respective channel wires are effective for the control of the code transmitter relay C2.

The relay C2, like the relay C of Fig. 1A, is deenergized at the start of the cycle, the deenergization of the relay C2 being by the opening of back contact 285 of relay LCS2. From then on, the relay C2 is pulsed in accordance with the respective marks that are selected for transmission. If the first code character is to be a mark, the relay C2 is picked up when the pendulum 388 of the oscillator CT2 swings through center for the first time so as to close the contact fingers 46 and 47. Thus, if energy is applied to the first channel wire 271, the relay C2 is picked up for applying the first mark to the line circuit through its front contact 286. The energization of the low resistance lower winding of the relay C2 at this time is accomplished through back contact 287 of relay CPP, front contact 288 of relay 4V2, front contact 289 of relay 2V2, contact fingers 46 and 47 of oscillator CT2, lower winding of relay C2, and front contact 290 of relay LCS2. This circuit for the energization of the relay C2 will be recognized as comparable to the circuit that has been specifically described for the energization of the relay C of Fig. 1A, except that the circuit for the relay C2 includes the back contact 287 of relay CPP so that the picking up of the relay CPP at the end of the first half of the indication communication cycle can be effective by the shifting of the contact 287 to determine that the relay C2 is energized for the second half of the communication cycle for the transmission of a mark as the first character in accordance with energy applied to the eighth channel wire 278. Similarly, the repeat of the operation of the relay C2 for the other characters during the second half of the code is in accordance with the closure of the front contacts 291, 292, 293, 294, 295, and 296 of relay CPP to the respective channel wires 279, 280, 281, 282, 283, and 284.

Having thus considered the manner in which the respective code characters can be selected for transmission, and applied to the line wires 297 and 298 through the front contact 286 of the relay C2, consideration will now be given as to the mode of operation particularly having to do with the repeat of the operation of the stepping relay bank for the second half of the cycle of operation.

The start of the oscillator CT2 is rendered effective by the opening of back contact 299 of relay LCS2, and after the last channel of communication is terminated for the first half of the indication cycle by the opening of the contact fingers 41 and 45 for the last time, a pickup circuit is closed for the relay CP the next time these contact fingers are closed extending from (+), including contact fingers 41 and 45 of oscillator CT2, back contact 300 of relay CPP, back contacts 301, 302, 303, and 304 of relays 4V2, 3V2, 2V2, and 1V2, respectively, front contact 305 of relay LCS2 and upper winding of relay CP, to (−). The relay CP when thus picked up is maintained energized, until the relay CPP is picked up, by a stick circuit extending from (+), including back contact 306 of relay CPP, front contact 307, and upper winding of relay CP, to (−). The picking up of this relay closes a shunt at front contact 308 for the lower winding of the relay CP so as to make this relay slightly slow in dropping away.

The picking up of relay CP at the end of the first half of the indication cycle of operation closes an obvious circuit through its front contacts 309 and 310, and front contact 285 of relay LCS2 to provide for the picking up of the relay C2. This relay when picked up closes pickup circuits for all of the stepping relays. Thus the relay 1V2 is picked up through front contact 211 of relay C2 and front contact 312 of relay CP; relay 2V2 is picked up through front contact 313 of relay C2 and front contact 314 of relay CP; relay 3V2 is picked up through front contact 315 of relay C2 and front contact 316 of relay CP; and relay 4V2 is picked up through front contact 317 of relay C2 and front contact 318 of relay CP.

With the stepping relays V2 all restored to their energized positions at the end of the first half of the indication cycle, the relay CPP is picked up so as to select the second group of channel wires for determining the codes to be transmitted during the last half of the cycle. The pickup circuit for the relay CPP extends through front contact 319 of relay CP, front contact 320 of relay LCS2, front contact 321 of relay 1V2, front contact 322 of relay 2V2, front contact 323 of relay 3V2, and front contact 324 of relay 4V2. This relay when picked up is maintained energized through its stick contact 325 and front contact 326 of relay LCS2 so that its dropping away is effective at the end of the cycle in response to the dropping away of relay LCS2. The relay LCS2 has been maintained picked up at the mid-point in the cycle by reason of the closure of back contact 327 of relay CPP, and at the time that the relay CPP is picked up, the picking up of the stepping relays V2 has become effective so that energy is maintained on the relay LCS2, and the particular relay LC that may be picked up at that time.

Upon the picking up of the relay CPP, the circuit that has been described by which the relay CP has been energized is opened at back contact 306 to cause this relay to be dropped away. Upon the dropping away of the relay CP, the opening of its front contact 328 deenergizes the oscillator CT2 to initiate a repeat of the operation of the stepping relay bank for the second half of the indication communication cycle, such repeat having the same mode of operation as has been specifically described for the mode of operation of the stepping bank for the transmission of controls with reference to Fig. 1A.

As in the transmission of controls, the relay LCS2 is dropped away at the end of the cycle when the pendulum 388 of the oscillator CT2 passes through center for the last time, and in accordance with the dropping away of this relay, the oscillator CT2 becomes energized through back contact 299, and the relay CPP is dropped away by the opening of its stick circuit at front contact 326. The oscillator has been energized at a prior time, however, when the stepping relays have become all dropped away as has been described with respect to energization of the oscillator CT (see Fig. 1A) at the end of a control cycle. The dropping away of relay CPP does not permit the energization of the relay CP, because the relay LCS2 has first been dropped away to open front contact 305. The picking up of the stepping relays at the end of the cycles is accomplished through back contacts of the relay C2 in series with back contacts of the relay LCS2 in a manner comparable to that which has been described with respect to the energization of the stepping relays at the end of a control cycle with reference to Fig. 1A, the relay C2 being dropped away at the end of the cycle when the pendulum 388 of the oscillator CT2 passes through center for the last time during the indication cycle.

*Reception of indications*

The reception of indications at the control office in accordance with the pulsing of the line relay L3 is accomplished in much the same manner as has been described for the reception of controls, except that there is a repeat of the operation of the stepping relay bank. The relays CS3 and CSP3 are governed, for the reception of indications, comparable to the relays CS and CSP of Fig. 1B, but there is no execution period used at the end of the cycle, as the indications are effective to control their respective indication magnetic stick relays immediately during the step following their reception. This is true except for the station registration code, which must necessarily be executed during the step following its completion. It is therefore provided that for the present embodiment, the station registration code is made up of the first two characters transmitted, and thus execution of the station registration code is accomplished at the beginning of the third step that is taken during the first half of the cycle.

The actuation of the relays M in response to the respective marks received is in accordance with the energization of circuits comparable to those which have been specifically described with reference to the energization of corresponding relays shown in Fig. 1B, and if the indication station registration code "mark-mark" is received, for example, the relays 1M3 and 2M3 are picked up. When the relay 3V3 is dropped away to initiate the third step of the receiving apparatus shown in Fig. 2A, an execution circuit is closed to cause the picking up of the station relay 1ST in accordance with the reception of this registration code. The relay 1ST is energized by a circuit extending from (+), including back contact 329 of relay CPP3, back contact 330 of relay CS3, back contact 331 of relay 3V3, front contact 332 of relay 1M3, front contact 333 of relay 2M3, and lower winding of relay 1ST, to (−). Relay 1ST is maintained picked up until the end of the indication communication cycle by energy applied through its stick contact 334 by front contact 335 of relay CSP3 connected in multiple with front contact 336 of relay CP3 and front contact 337 of relay CPP3. The relay CS3 is in its deenergized position except for the mid-point of the cycle, and either one or the other of front contacts 336 and 337 of relay CP3 and CPP3 are closed to bridge this period during which the relay CS3 is energized.

The relay 1ST in picking up connects the magnetic stick relays associated with that station to the respective channel wires to which they are assigned for particular steps corresponding to the steps during which communication of associated indications is established. Thus, for example, the indication relay 2TK of Fig. 2A is governed by the conditions of the track relay 2TR of Fig. 2B so as to be actuated in correspondence therewith during the third step of the indication cycle. The channels for the first half of the communication cycle are selected through front contacts of the relay CP3, because this relay is picked up at the beginning of the cycle and is maintained energized until the picking up of the relay CPP3 at the beginning of the second half of the indication cycle. The circuit by which the relay CP3 is picked up at the beginning of the indication cycle extends from (+), including back contact 338 of relay CS3, front contact 339 of relay 4V3, upper winding of relay CP3 and back contact 340 of relay CPP3, to (−). The inclusion of back contact 340 of relay CPP3 provides that the relay CP3 cannot be picked up for the second half of the cycle when the relay CS is dropped away for the second time. Relay CP3 is maintained picked up through its stick contact 341 in accordance with energy applied at front contact 343 of relay CSP3.

It is therefore provided that if a mark is transmitted during the third step of an indication cycle during which the relay 1ST is picked up, the track indication relay 2TK is energized with a polarity to cause its contacts to be picked up. The circuit for the energization of relay 2TK extends from (B+), including front contact 344 of relay 3M3, front contact 345 of relay 1V3, back contact 346 of relay 4V3, front contact 347 of relay CP3, front contact 348 of relay 1ST and winding of relay 2TK, to (CN). In accordance with the relay 2TK being in its picked up position, the back contact 349 is open so as to cause the track indication lamp TE to be normally deenergized in accordance with its associated track section being unoccupied by a train. It will be noted from the circuit described for the relay 2TK that this circuit is selected through the front contact 344 of relay 3M3 in accordance with the reception of a mark during the third step, but the circuit is closed only at the beginning of the fourth step in accordance with the dropping away of the relay 4V3 to close back contact 346. In a similar manner the other indications that are transmitted during the first half of the indication cycle are effective to actuate magnetic stick relays, these relays being energized through respective front contacts 350, 351, 352, and 353 of the relay CP3.

When the last step is taken during the first half of the indication communication cycle, the relay CS3 is picked up by the energization of its lower winding through contact fingers 41 and 45 of oscillator CT3, back contacts 354, 355, 356, and 357 of relays 1V3, 3V3, 4V3, and 2V3, respectively. It is the closure of front contact 358 of relay CS3 that establishes a circuit for the energization of the magnetic stick relay controlled by the last step of the first half of the indication cycle.

In accordance with the picking up of the relay CS3 at the mid-point in the indication cycle, the closure of front contact 359 establishes a pickup circuit closed through front contact 360 of relay CP3 for the relay CPP3. The picking up of this relay closes a stick circuit through its front contact 361 and front contact 362 of relay CP3 so as to maintain the relay CPP3 picked up during the cross-over time of the contact 359 of relay CS3 when this relay is dropped away by the opening of its circuit at front contact 363 of relay L3 at the beginning of the second half of the indication cycle. When the back contact 359 of relay CS3 is closed, the upper winding of relay CPP3 is energized by a stick circuit through front contact 364 so as to maintain the relay CPP3 picked up for the last half of the cycle. Upon the picking up of relay CPP3, the opening of back contact 340 deenergizes the relay CP3 to cause this relay to be dropped away and to thereby provide that the magnetic stick relays to be energized during the last half of the cycle is a group that has their circuits connected to back contacts 365, 366, 347, 350, 351, 352, and 353. It will thus be seen that the relay CP3 selects one group of magnetic stick relays for energization during the first half of the indication cycle, and when dropped away at the mid-point of the indication cycle, selects a second group of magnetic stick relays to be governed by the code characters that are received.

Having thus considered specifically the circuit organization and mode of operation of the indication receiving apparatus at the control office (Fig. 2A) that is different from the code receiving apparatus provided for the reception of controls at the field location (Fig. 1B), it should be readily understood, from the description as it has been set forth with respect to the reception of controls, as to how termination of the indication cycle is accomplished and how the respective stepping circuits operate.

Should the system be initiated by an extraneous momentary interruption of the line circuit, the indication receiving apparatus at the control office would be initiated and would be actuated through the first half of the cycle. This operation would cause the picking up of the relay CP3 in an attempt to condition the system for the reception of the second half of an indication cycle. However, if the system has been initiated by a momentary deenergization of the line circuit by extraneous means, there will be no opening of the line circuit at a time corresponding to the beginning of the second half of the cycle, and thus there will be no circuit closed for the picking up of the relay CPP3 to intiate the second half of a cycle, and the apparatus will be automatically restored to its normal position like at the end of a control cycle.

It will be noted that when relay CPP3 is picked up during a normal indication cycle for the second half of the cycle, its pickup circuit is closed through front contact 360 of relay CP3, and this relay CPP3 when picked up is held during the crossover time of the contact 359 of relay CS3 by a shunt applied to the lower winding of relay CPP3 by the condenser 342, through the stick contact 361.

*Line circuits*

Figure 4A:
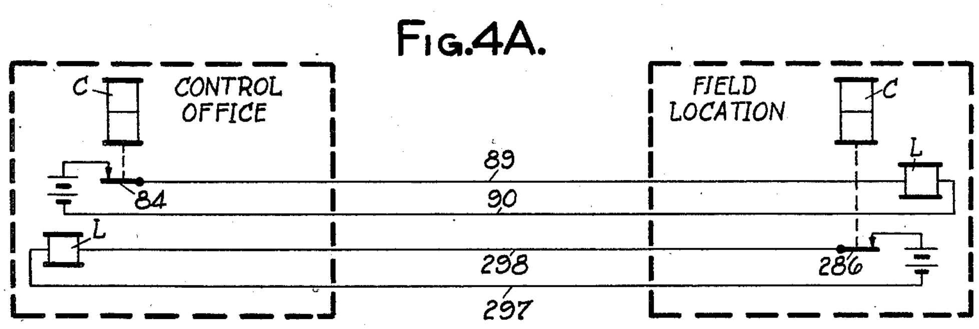
Figure 4B:
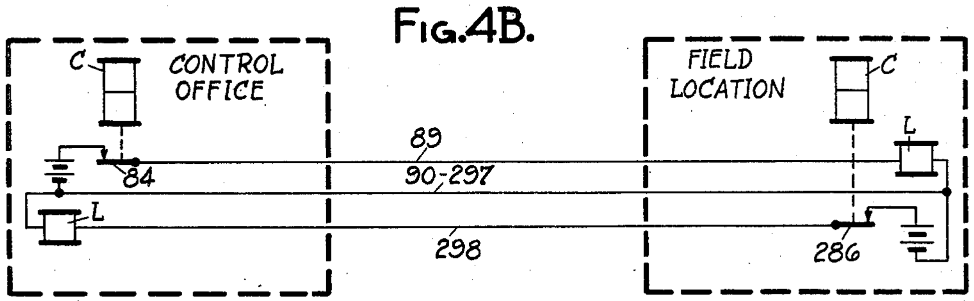

It should be readily understood from the system for the communication of controls and indications respectively that has been described, that because of the transmission of controls and indication being provided by separate apparatus, various known line communication expedients may be employed. The four wire line circuit communication system illustrated in Fig. 4A is the system that has been assumed in the description as it has been set forth. From a more practical point of view, however, it is of course unnecessary to run four line wires to connect the control office with the field location and therefore, if desired, the return circuits for the control and indication systems can be applied to a common wire 90—297 as shown in Fig. 4B, the other line wires being maintained as is shown in Fig. 4A, and as has been described with reference to Figs. 1 and 2.

Figure 4C:
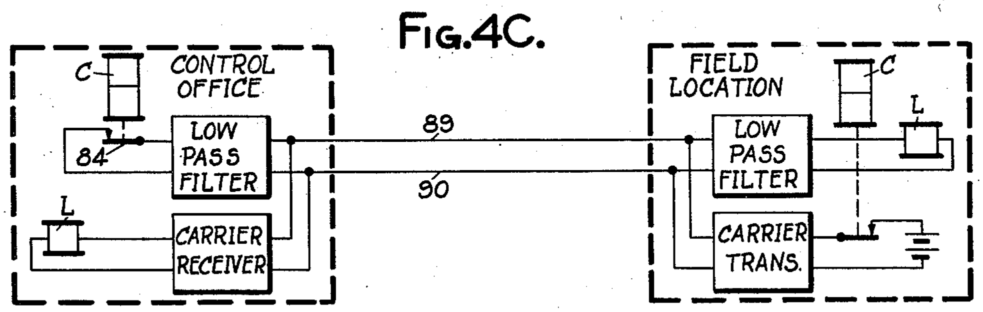

If it is desired to further reduce the number of line wires, a two-wire circuit may be employed as is shown in Fig. 4C, for example, wherein the transmission of controls is accomplished by a line circuit comparable to that shown for the transmission of controls in Fig. 4A, except that transmission is made through a low pass filter at the control office, and reception at the field location is accomplished through a similar filter. This is done so that the communication of indications can be by carrier system as is indicated conventionally by block diagram, the carrier current being applied at the field location to the line wires 89 and 90 and being taken off of these line wires at the control office through suitable carrier receiving apparatus.

Figure 4D:
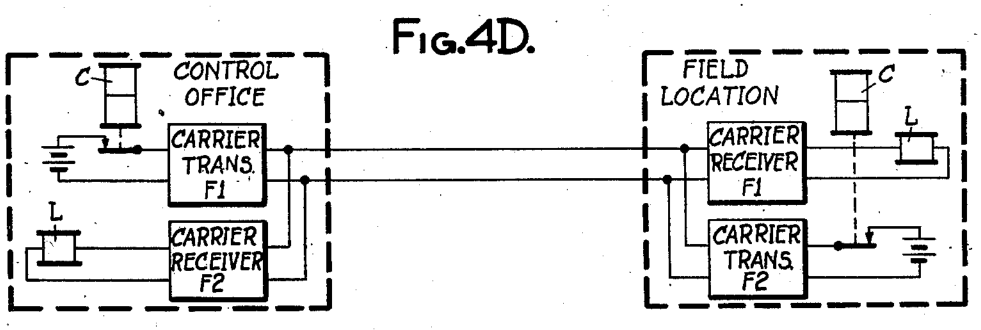

Another system which may be employed, in accordance with the requirements of practice, is a system such as is illustrated in Fig. 4D wherein communication of both controls and indications is accomplished by carrier transmission, a different carrier frequency being used for each of the respective communication systems. By this organization, both the transmission of controls and the transmission of indications can be applied to a line circuit that may be used for telephone communication, or for other purposes, so as to require no separate line circuit to be assigned solely to the communication of switch and signal controls and indications.

It should be readily apparent from the description as it has been set forth of the operation of the stepping relays, that the novel features relative to stepping relay operation are not limited to the particular oscillator type of timing device with which they have been shown, but other half-step timing devices such as relays or motor driven timers may be used in place of the oscillator timing mechanism disclosed in the particular embodiment of the present invention that has been shown in the drawings.

It is also to be understood that if it is considered unnecessary to form the respective steps by dropping away the stepping relays, the principles of operation as they have been set forth readily applicable to a normally deenergized stepping relay bank. That is, the novel method of forming the steps by actuation of the stepping relays at intervals indicated in the description as it has been set forth, irrespective of whether the actuation of such relays is to a picked up or a dropped away position, is applicable to either a normally energized or a normally deenergized stepping bank. If the stepping bank is to be normally deenergized, it will be desirable to use some sort of voltage regulation means so that the operating characteristics of the stepping relays at both transmitting and receiving stations may always be the same. This is assuming that maximum operating speed is desired, thus requiring accuracy of timing of the actuation of the stepping relays. If speed of operation is not essential, by slowing down the system sufficiently, it will be readily apparent that the system could be used with normally deenergized stepping relay banks without requiring voltage regulation.

Having thus described one particular embodiment of the present invention as applied to the governing of traffic through a specific simple track layout, it is to be understood that the system is readily adaptable to the governing of practically any track layout to be encountered in practice, and that various modifications, adaptations, and alterations may be made to the specific forms shown and described in accordance with the requirements of practice, except as limited by the appending claims.

What we claim is:

1. A code communication system for communicating a control code from a transmitting station to a receiving station comprising, a line circuit connecting said stations, a normally inactive timing device at each station effective when rendered active to actuate two contacts alternately at regular time intervals to predetermined positions, manually operable means at the transmitting station for rendering said timing device at the associated station active to actuate said contacts when a control code is designated for transmission over said line circuit, means at the receiving station for rendering said timing device at the associated station active in response to an initial change in the condition of energization of said line circuit so as to actuate its contacts for a predetermined number of times, a bank of several normally energized stepping relays at each station for counting respective time periods of a code communicated over said line circuit, said stepping relays being deenergized, one at a time, alternate stepping relays of a predetermined order of operation being deenergized by actuation of the same contact of said timing device, and decoding means at said receiving station effective to register each time when said line circuit is energized during a step of the stepping relay bank at that station.

2. A code communication system for transmitting a control code from a transmitting station to a remote receiving station comprising in combination, a line circuit connecting said stations, an oscillatory timing device at each of the stations having a torsional pendulum spring biased to a center position with respect to rotation, said timing device having two groups of contacts, one of said groups being closed when and only when the pendulum of the associated timing device is in a particular rotated direction from said center position, and the other of said groups of contacts being closed when and only when the pendulum is in the opposite rotated position from said center position, said timing device having an electromagnet effective when energized to attract and retain said pendulum in a rotated position displaced from said center position, manually operable means at the transmitting station for designating a control for transmission to the receiving station, a normally energized bank of stepping relays at each station effective in response to the successive opening of the respective groups of contacts of said timing device at the associated station to take one step by the deenergization of one of said stepping relays each time one of said groups of contacts is opened for several successive operations of the associated timing device, code transmitting means at the transmitting station responsive to said manually operable means for deenergizing said electromagnet of the timing device at that station for a period of time sufficient to permit several free oscillations of the oscillatory pendulum, said code transmitting means being effective to transmit several selected code characters over said line circuit to the receiving station during the stepping operation, the characters being counted by said stepping relays and their duration being measured by said device, and code receiving means at the receiving station effective to deenergize said timing device at that station upon a change in the character of energization of the line circuit just prior to the reception of the first of said series of code characters and thereby initiate operation of the timing device and associated stepping bank of relays at the receiving station into a cycle of operation for the reception of the series of code characters that has been transmitted from the transmitting station.

3. A code communication system for communicating a control from a transmitting station to a receiving station comprising, a line circuit connecting said stations, a normally inactive timing device at each station effective when rendered active to actuate two groups of contacts alternately to predetermined positions, manually operable means for rendering said timing device active at the transmitting station when a control is to be communicated to the receiving station, means at the receiving station for rendering said timing device active at that station in response to an initial change in the condition of energization of said line circuit, a bank of several normally energized stepping relays at each station for counting respective time periods of a code communicated over said line circuit from the transmitting station to the receiving station, said stepping relays being deenergized one at a time, one relay being deenergized each time one of said groups of contacts is actuated to its particular position until all of the stepping relays are in their dropped away position, and circuit means governed exclusively by certain relays of the stepping bank for actuating at least one of said stepping relays for a second time during a cycle of operation of the stepping bank prior to all of the stepping relays becoming dropped away so as to form a greater number of distinctive steps than the actual number of stepping relays contained in the stepping bank.

4. A code communication system connecting respective transmitting and receiving stations comprising, a line circuit extending between said stations, a normally inactive timing device at each station effective when rendered active to actuate contacts to alternate circuit controlling positions at predetermined time intervals, manually operable means at the transmitting station for rendering said timing device active to actuate its contact several times upon designation of a code for transmission, receiving means at the receiving station for rendering said timing device active in response to an initial change in the condition of energization of said line circuit, a bank of several normally energized stepping relays at each station for counting respective time periods of energization of said line circuit during the transmission of a code from the transmitting station to the receiving station, circuit means governing the energization of said stepping relays so as to deenergize alternate stepping relays of a predetermined order of operation in accordance with the respective alternate actuation of the contacts of said timing device at the associated station, said circuit means being effective to provide for the deenergization of one of the stepping relays each time the contacts of said timing device are actuated until all of the stepping relays become dropped away, and pick-up circuit means for each of a plurality of the relays of said stepping bank effective to energize the associated relay in turn in response to the dropping away of another of the stepping relays, said pickup circuit means being effective to permit the deenergization of the associated relays for a second time in a particular predetermined order in response to the actuation of the associated timing device so as to increase the number of steps taken by the stepping bank over the number of stepping relays that the stepping bank contains.

5. A code communication system for communicating a control from a transmitting station to a receiving station comprising, a line circuit connecting said stations, a normally inactive timer at each station effective when rendered active to actuate two groups of contacts to predetermined positions alternately at regular predetermined time intervals, manually operable means for rendering said timer active at the transmitting station when a control is to be communicated to the receiving station, means for rendering said timer active at the receiving station in response to a change in the condition of energization of said line circuit, a bank of normally energized stepping relays at each station, and circuit means governing the energization of said stepping relays so as to deenergize them one at a time in a predetermined numerical order, one odd numbered stepping relay being deenergized each time one of said groups of contacts of said timer is actuated to a particular position, and one even numbered stepping relay being deenergized each time the other of said groups of contacts of said timer is actuated to a particular position, said circuit means being effective to restore certain of the odd and even numbered stepping relays for the first several steps to their respective energized positions during subsequent steps, only one of said relays being actuated by energization during any one stepping period, and said circuit means permitting the deenergization of said certain relays for the second time during the stepping operation in accordance with the actuation of the associated timing device, one relay being deenergized at a time the same as at the beginning of the operation of the stepping bank as a partial repeat of the operation of the relays of the stepping bank after all stepping bank relays have been deenergized successively for the first time, and decoding means at said receiving station effective to register when said line circuit is energized during the respective steps of the stepping relay bank at that station.

6. In a remote control system, a stepping organization comprising a normally inactive half step device effective when rendered active to actuate two circuit control contacts alternately at regular time intervals, a bank of several stepping relays, circuit means effective when said half step device is inactive to steadily energize said bank of stepping relays, said circuit means being effective when said half step device is rendered active to deenergize said stepping relays in a predetermined numerical order, one relay at a time, the odd numbered relays being deenergized only upon actuation of one of said contacts and the even numbered relays being deenergized only upon actuation of the other of said contacts, and restoration circuits means effective before all of the stepping relays have become contemporaneously dropped away to energize at least one of the stepping relays that has been deenergized for a prior step so that it can again be deenergized subsequent to the dropping away of the last step relay to form a greater number of steps per cycle of operation of the stepping bank than the number of relays in said stepping bank.

7. In a remote control system, a stepping organization comprising a timing device having two contacts that can be actuated alternately at regular time intervals to respective predetermined positions when said timing device is rendered active, a bank of several stepping relays having predetermined normal positions when said device is inactive, circuit means effective when said timing device is rendered active for actuating said stepping relays in numerical order, one at a time, one odd numbered relay being actuated each time one of said contacts is actuated to a particular position, and one even numbered relay being actuated each time the other of said contacts is actuated to a particular position, and restoration circuit means effective during the actuation of the relays of said stepping bank before all stepping relays have contemporaneously assumed their actuated positions to restore a plurality of stepping relays for prior steps, one at a time, to their normal position, said circuit means permitting the actuation of said prior actuated relays subsequent to the actuation of the last in numerical order of said stepping relays successively to form additional steps as a partial repeat of the operation of the stepping bank so as to form a greater number of distinctive steps than the number of relays in the stepping bank.

8. In a remote control system, a stepping organization comprising a normally inactive timing device having two contacts that can be actuated alternately to predetermined positions at regular time intervals when said timing device is rendered active, a bank of several stepping relays, circuit means effective when said timing device is rendered active to actuate the relays of said stepping bank in numerical order, one relay at a time, one odd numbered relay being actuated each time one of said contacts of said timing device is actuated to a particular position, and one even numbered relay being actuated each time the other of said contacts is actuated to a particular position, and restoration circuit means effective before all of said stepping relays have become actuated to assume contemporaneously a predetermined position subsequent to said timing device being rendered active to restore the stepping relays that have been actuated for prior steps to their normal positions, said restoration circuit means permitting the actuation of said prior actuated relays successively for a second time to form additional steps as a partial repeat of the operation of the stepping bank so as to form a greater number of distinctive steps than the number of relays in the stepping bank.

9. In a remote control system, a stepping organization comprising a normally inactive half step device effective when rendered active to actuate two circuit control contacts to give positions alternately at regular time intervals, a bank of several stepping relays, circuit means effective when said half step device is inactive to steadily energize said bank of stepping relays, said circuit means being effective when said half step device is rendered active to deenergize said stepping relays in a predetermined numerical order, one odd numbered relay being deenergized each time one of said contacts is actuated to its given position, and one even numbered relay being deenergized each time the other of said contacts is actuated to its given position, pick up circuit means for said stepping relays effective before all of the stepping relays are contemporaneously dropped away to energize at least one of the stepping relays that has been deenergized for a prior step so that it can again be deenergized so as to form another step by its deenergization subsequent to the dropping away of the last step relay in said numerical order, and repeat stepping means effective upon the completion of the operation of the stepping relays so that they are all in their dropped away positions contemporaneously for causing said bank of stepping relays to repeat their operations.

10. In a remote control system, a stepping organization comprising in combination, a normally inactive half step device effective when rendered active to actuate two circuit control contacts alternately at regular time intervals to predetermined circuit controlling positions, a bank of several stepping relays, circuit means for normally energizing said stepping relays when said half step device is inactive, said circuit means being effective when said timing device is rendered active to deenergize said relays in a predetermined numerical order, one relay at a time, one odd numbered relay being deenergized each time one of said contacts of said half step device is actuated to a particular position, and one even numbered relay being deenergized each time the other of said contacts of said half step device is actuated to a particular position, said circuit means being effective in response to the dropping away of at least one odd numbered stepping relay to energize the next preceding odd numbered stepping relay that has been dropped away for a preceding step, said circuit means being effective in response to the dropping away of at least one even numbered stepping relay to energize the next preceding even numbered relay that has been dropped away for a preceding step, and said circuit means being rendered effective subsequent to the dropping away of the last step relay during a cycle of operation of the relays of the stepping bank for causing the deenergization of said stepping relays that have been energized for the second time during the cycle of operation, one relay at a time, one odd numbered relay being deenergized each time said one of said contacts of said half step device is actuated to a particular position, and one even numbered relay being deenergized each time said other of said contacts of said half step device is actuated to said particular position.

11. In a remote control system, a stepping organization comprising a timing device having a torsional pendulum spring biased to a center position with respect to rotation, said timing device having two contacts actuated alternately to respective predetermined positions in accordance with the rotation of said pendulum in opposite directions respectively through said center position, said timing device having an electromagnet effective when energized to maintain said pendulum in a particular extreme rotated position, whereby the deenergization of said electromagnetic structure permits the free oscillation of said pendulum so as to actuate said contacts several times at substantially even time spaced intervals, a bank of several stepping relays, circuit means for normally energizing said stepping relays, said circuit means being effective when said timing device is rendered active to deenergize said stepping relays in a predetermined numerical order, one relay at a time, one odd numbered relay being deenergized each time one of said contacts is actuated to a particular position, and one even numbered relay being deenergized each time that the other of said contacts is actuated to a particular position.

12. In a remote control system, a stepping organization comprising, a normally inactive timing device having a torsional pendulum spring biased to a center position with respect to rotation, said timing device having two contacts which are closed alternately to particular predetermined positions at times when the pendulum rotates through its center position, a normally energized bank of several stepping relays, said stepping relays being deenergized upon said timing device being rendered active, one at a time, in a predetermined numerical order, one odd numbered relay being deenergized each time one of said contacts of said timing device is actuated to a particular position, and one even numbered relay being deenergized each time the other of said contacts of said timing device is actuated to a particular position, and circuit means effective before all of said stepping relays have become contemporaneously dropped away to restore stepping relays for certain prior steps to their normally energized positions, said circuit means permitting the deenergization of said prior relays successively subsequent to the deenergization of the last stepping relay in said predetermined order in accordance with the actuation of said timing device as a partial repeat of the operation of the relays of said stepping bank so as to form a greater number of distinctive steps than the number of relays included in the stepping bank.

13. In a remote control system, a stepping organization comprising an oscillatory timing device having a torsional pendulum spring biased to a center position with respect to rotation, said timing device having two contacts that are actuated to particular predetermined positions alternately as the pendulum of the timing device swings through its center position in respective opposite directions of rotation, a bank of stepping relays, circuit means for energizing said stepping relays when said timing device is inactive, said circuit means being effective upon said timing device being rendered active to deenergize said stepping relays in a predetermined numerical order, one relay at a time, one odd numbered relay being deenergized each time one of said contacts is actuated to a particular position, and one even numbered relay being deenergized each time the other of said contacts is actuated to a particular position, and restoration circuit means effective before all of the stepping relays have become contemporaneously deenergized to restore energization for certain stepping relays that have been actuated for prior steps, said circuit means permitting the deenergization of said prior actuated relays successively subsequent to the deenergization of the last of said stepping relays as a partial repeat of the deenergization of the relays of the stepping bank so as to form a greater number of distinctive steps than the number of relays in the stepping bank.

14. In a remote control system, a stepping organization comprising a normally inactive timing device having a torsional pendulum spring biased to a center position with respect to rotation, said timing device having two contacts which are actuated to respective predetermined positions alternately as the pendulum of the timing device rotates in respective opposite directions through said center position, a normally energized bank of several stepping relays, said bank of stepping relays being rendered effective in response to said timing device being rendered active to actuate its relays in numerical order, one relay at a time, one odd numbered relay being actuated each time one of said contacts is actuated to a particular position, and one even numbered relay being actuated each time the other of said contacts is actuated to a particular position, and circuit means effective before the stepping relays have become contemporaneously operated to predetermined actuated positions during a cycle of operation of said stepping relay bank to restore stepping relays for steps prior to the last step to their normal positions, said circuit means permitting the actuation of said relays for prior steps subsequent to the actuation of the last stepping relay in said numerical order in response to actuation of said contacts of said timing device so as to form a greater number of distinctive steps for the cycle of operation of the stepping bank than the number of relays which the stepping bank contains.

15. In a remote control system, a stepping organization comprising in combination, a normally inactive oscillatory timing device having a torsional pendulum spring biased with respect to rotation to a center position, and having two contacts actuated by the rotation of the pendulum, a bank of several stepping relays, and circuit means for normally energizing said stepping relays when said timing device is inactive, said circuit means being effective when said timing device is rendered active to deenergize said stepping relays in a predetermined numerical order, one relay at a time, one odd numbered relay being deenergized each time one of said contacts of said timing device is actuated to a particular position, said circuit means being effective in response to the dropping away of at least one odd numbered relay to energize the next prior odd numbered relay that has been dropped away for a preceding step, said circuit means being effective in response to the dropping away of at least one even numbered stepping relay to energize the next prior even numbered stepping relay that has been dropped away for a preceding step, and circuit means rendered effective subsequent to the dropping away of the last step relay for causing the deenergization, one at a time, of the respective relays that become energized for the second time during the stepping operation as a partial repeat of the first part of the stepping cycle of operation so as to form a greater number of distinctive steps than the number of relays contained in the stepping bank.

16. In a remote control system, a stepping organization comprising an oscillatory timing device having a torsional pendulum spring biased to a center position and having contacts closed when said pendulum is in its respective rotated positions with respect to said center position, a bank of several stepping relays, and circuit means for normally energizing said stepping relays when said timing device is inactive, said circuit means being effective when said timing device is rendered active to deenergize said stepping relays in a predetermined numerical order, one odd numbered stepping relay being deenergized each time one of said contacts of said timing device is actuated to a particular position, and one even numbered stepping relay being deenergized each time the other of said contacts of said timing device is actuated to a particular position, said circuit means being effective in response to the dropping away of at least one odd numbered stepping relay to energize the next prior odd numbered relay that has been dropped away for a preceding step, said circuit means being effective in response to the dropping away of at least one even numbered stepping relay to energize the next preceding even numbered relay that has been dropped away for a preceding step, and said circuit means being rendered effective subsequent to the dropping away of the last step relay for causing the deenergization of said stepping relays that become energized for the second time during the stepping cycle of operation, one odd numbered relay being deenergized when said one contact of said timing device is actuated to its particular position, and one even numbered stepping relay being deenergized when said other of said contacts of said timing device is actuated to its particular position.

17. In a remote control system, a stepping organization comprising in combination, a normally inactive oscillatory timing device having a torsional pendulum spring bias with respect to rotation to a center position and having two contacts actuated by the rotation of the pendulum, said timing device having a normally energized electromagnet normally holding said pendulum in an extreme rotated position in a particular direction and effective when deenergized for a substantial time interval to permit said pendulum to swing freely in oscillatory rotation, a bank of several stepping relays, circuit means for governing the energization of said stepping relays, said circuit means being effective to normally energize said stepping relays when said timing device is inactive, said circuit means being effective when said timing device has its electromagnet deenergized to deenergize said stepping relays in a predetermined numerical order, one odd numbered relay being deenergized each time one of said contacts is actuated to a particular position, and one even numbered relay being deenergized each time the other of said contacts is actuated to a particular position, said circuit means being effective prior to all of the stepping relays being contemporaneously dropped away to energize at least one odd numbered or even numbered relay that has been deenergized for a prior step so that such stepping relay can be deenergized for the second time to form an additional step, and circuit means effective upon the initial completion of the operation of said bank of stepping relays to only momentarily energize said electromagnet and thereby initiate the operation of said stepping bank so as to repeat its operation.

18. In a remote control system, a stepping organization comprising an oscillatory timing device having a torsional pendulum spring bias to a center position with respect to rotation, said timing device having two contacts that are actuated to particular predetermined positions alternately as the pendulum of the timing device swings through its center position in respective opposite directions of rotation, and said timing device having an electromagnet which when energized maintains said pendulum in an extreme rotated position from said center position, said electromagnet being normally energized to normally render said timing device inactive, a bank of stepping relays, circuit means for energizing said stepping relays when said timing device is inactive, said circuit means being effective upon said timing device being rendered active to deenergize said stepping relays in a predetermined numerical order, one odd numbered relay being deneergized each time one of said contacts is actuated to a particular position, and one even numbered relay being deenergized each time the other of said contacts is actuated to a particular position, and circuit means effective upon the completion of operation of the relays of said stepping bank for energizing said electromagnet only momentarily so as to initiate a repeat of the deenergization of the respective stepping relays for each time that the timing device has been initially rendered active.

19. A code communication system for communicating designated switch and signal controls from a transmitting station to a receiving station, a line circuit connecting the transmitting and receiving stations, normally at rest transmitting and receiving code communication apparatus at the respective transmitting and receiving stations operable when initiated through respective cycles of operation for communication of respective control codes for governing respective track switches and signals at the receiving station, a bank of decoding relays at the receiving station governed by said receiving code communication apparatus, a magnetic stick switch control relay at the receiving station for each of the track switches, a signal control relay at the receiving station, a magnetic stick check relay at the receiving station for each of the track switches, and execution circuit means including contacts of said decoding relays for energizing said switch control and signal control relays in accordance with the respective switch and signal control codes received, said execution circuit means for the energization of the switch control relays including normally open contacts of the associated magnetic stick check relays and said execution circuit means including normally closed contacts of the magnetic stick checking relays in the control circuits of the signal control relays for all track switches included in a route governed by the associated signal, and said execution circuit means being effective to actuate said magnetic stick checking relay for any track switch to open said normally closed contact and close said normally open contacts only provided that the associated switch control magnetic stick relay has responded in correspondence with the condition of this relay that is called for by the code that has been received.

20. A code communication system for communicating selected controls from a transmitting station to a receiving station, a line circuit connecting the transmitting and receiving stations, normally at rest transmitting and receiving code communication apparatus at the respective transmitting and receiving stations operable when rendered active through a cycle of operation for communication of a control code from the transmitting station to the receiving station, said receiving apparatus including a bank of decoding relays that are conditioned in accordance with the respective code characters received during a cycle of operation of the code communication apparatus at the receiving station, a control relay at the receiving station, a magnetic stick check relay at the receiving station, and execution circuit means including contacts of said decoding relays for energizing said control relay and for actuating said magnetic stick relay, said circuit means including a normally open contact of said magnetic stick relay in the circuit of said control relay, said circuit means being effective to actuate said magnetic stick relay to close said normally open contact by the energization of a circuit selected by the same decoding relay selections that select the energization of said control relay, except for at least one decoding relay that is used in governing the character of energization of said control relay, said circuit means being effective to actuate said magnetic stick relay to its normal position by the energization of a circuit checking correspondence of the condition of said control relay with the condition of the decoding relays.

21. A code communication system for communicating selected switch controls from a transmitting station to a receiving station comprising in combination, a line circuit connecting the transmitting and receiving stations, normally at rest transmitting and receiving code communication apparatus at the respective transmitting and receiving stations operable through a cycle of operation for communicating a particular switch control code from the transmitting station to the receiving station, said receiving apparatus including a bank of decoding relays that are conditioned in accordance with the respective code characters received during a communication cycle of operation, a magnetic stick switch control relay at the receiving station, a magnetic stick check relay at the receiving station, and execution circuit means including contacts of said decoding relays for energizing said magnetic stick switch control relay at the end of a control cycle in accordance with the reception of a predetermined code, said switch control relay being energized through a normally open contact of said magnetic stick check relay, said circuit means being effective to actuate said magnetic stick check relay to close said normally open contact by the energization of a circuit extending through contacts of said decoding relays comparable to contacts used in the circuit for the energization of said magnetic stick switch control relay, except for at least one decoding relay that is used specifically in governing the character of energization of said switch control relay, said circuit means being effective to actuate said magnetic stick relay to its normal position by the energization of a circuit checking correspondence of the code stored by said decoding relays with the actuated position of said switch control relay.

22. A centralized traffic control system for railroads comprising, a control office remote from a field station at a track layout having a power switch and signals for governing traffic in both directions over the track switch, a line circuit connecting the office and the field station, and normally inactive code transmitting and receiving communication apparatus at the respective stations effective when rendered active to communicate selected controls for said switch and signals from the control office to the field station over said line circuit by mark and space code characters, and to communicate indications of changes of conditions of said switch and signals from the field station to the control office by mark and space codes, said communication apparatus at each station having a local timer operable when rendered active through a series of free oscillations to actuate contacts at a fixed rate, irrespective of the rate of code pulses being transmitted over the line circuit, and having a bank of stepping relays actuated step by step by the contacts of said timer when it is rendered active.

23. A code communication system for communicating selected control codes from a transmitting station to a receiving station for operating a device at the receiving station comprising in combination, a communication channel connecting said stations, a normally inactive timer at each station effective when rendered active to actuate its contacts alternately at regular time intervals to predetermined positions, manually operable means at the trnasmitting station for rendering said timer at the transmitting station active, said manually operable means being effective to act upon said communication channel for the initiation of the timer at the receiving station, means at the receiving station for rendering said timer at the associated station active in response to an initial change in the condition of said communication channel, a bank of several stepping relays at each of the stations for counting respective time periods as measured by the timer at the associated station, said stepping bank having predetermined normal conditions of its relays, and said bank of stepping relays having a smaller number of relays than the number of steps required to be taken in connection with the communication of a single control code, circuit means effective when said timer is rendered active at each of the stations to actuate the relays of the stepping bank at the associated station from their normal positions in a predetermined order, one relay being actuated to form a step each time one of said contacts is actuated to its predetermined position, said circuit means being effective when operation of the stepper has been initiated to operate certain of said stepping relays for at least a second time before the condition of the bank of stepping relays is restored to said predetermined condition, transmitting means including contacts of said stepping relays at the transmitting station for applying a selected succession of code characters to said communication channel, and receiving means including contacts of said stepping relays at the receiving station for operating said device in accordance with the different codes that are received over said communication channel.

24. A code communication system for communicating selected control codes from a transmitting station to a receiving station over a communication channel for operating a device at the receiving station comprising in combination, an oscillatory timer at each of the stations having a torsional pendulum spring biased to a center position with respect to rotation, said timer having two groups of contacts, one of said groups of contacts being closed when and only when the pendulum of the associated timing device is in a particular rotated direction from said center position, and the other of said groups of contacts being closed when and only when the pendulum is in the opposite rotated position from said center position, said timer having an electromagnet effective when energized to attract and retain said pendulum in a rotated position displaced from said center position, manually operable means at the transmitting station for deenergizing said timer at the associated station to initiate its operation, said manually operable means being effective to act upon said communication channel for the initiation of the timer at the receiving station, means at the receiving station for rendering said timer at the associated station active in response to an initial change in the condition of said communication channel, a bank of several stepping relays at each of the stations for counting respective time periods as measured by the timer at the associated station, said bank of stepping relays having predetermined normal conditions of its relays, and said bank of stepping relays having a smaller number of relays than the number of steps required to be taken in connection with the communication of a single code, circuit means effective when said timer is rendered active at each of the stations to actuate the relays of the stepping bank at the associated station from their normal positions in a predetermined order, one relay being actuated to form a step each time one of said groups of contacts is actuated to a particular position, said circuit means being effective when operation of the stepper has been initiated to operate certain of said stepping relays for at least a second time to form additional steps before the condition of the stepping relays is restored to said predetermined normal conditions, means at the transmitting station including contacts of said stepping relays at the associated station for applying a selected succession of code characters to said communication channel, and means at the receiving station including contacts of said stepping relays at the associated station for operating said device in accordance with the code received over the communication channel.

25. In a remote control system, a stepping organization comprising a timing device having contacts that can be operated alternately at regular time intervals when said timing device is rendered active, a bank of stepping relays having predetermined normal positions which are assumed when said device is inactive, circuit means effective when said timing device is rendered active to actuate the relays of said stepping bank from their normal positions in a predetermined order, one relay being actuated to form a step each time one of said contacts is actuated, said circuit means being effective when operation of the stepper has been initiated to operate certain of said stepping relays for at least a second time before the condition of the bank of stepping relays is restored to said predetermined condition.

26. In a remote control system, a stepping organization comprising an oscillatory timing device having a torsional pendulum spring biased to a center position and having contacts that are operated alternately at regular time intervals when said timing device is rendered active, a bank of stepping relays having predetermined normal positions when said device is inactive, circuit means effective when said timing device is rendered active to actuate the relays of said stepping bank from their normal positions in a predetermined order successively, one relay being actuated to form a step each time one of said contacts is actuated, said circuit means being effective subsequent to initiation of the stepping to operate certain of said stepping relays for at least a second time before the condition of the bank of stepping relays is restored to said predetermined normal positions.

References Cited in the file of this patent

UNITED STATES PATENTS

| | | |
|---|---|---|
| 1,689,294 | Potts | Oct. 30, 1928 |
| 1,852,367 | Plank | Apr. 5, 1932 |
| 2,085,039 | Plank | June 29, 1937 |
| 2,119,303 | Vantassel | May 31, 1938 |
| 2,126,210 | Preston | Aug. 9, 1938 |
| 2,139,562 | Preston | Dec. 6, 1938 |
| 2,152,384 | Lewis | Mar. 28, 1939 |
| 2,351,588 | Field | June 20, 1944 |
| 2,433,362 | Hartley et al. | Dec. 30, 1947 |
| 2,468,065 | Hartley et al. | Apr. 26, 1949 |
| 2,533,765 | Chauveau | Dec. 12, 1950 |
| 2,611,074 | Pascoe et al. | Sept. 16, 1952 |
| 2,626,314 | Coley | Jan. 20, 1953 |
| 2,626,382 | Coley | Jan. 20, 1953 |